(12) United States Patent
Chen et al.

(10) Patent No.: US 10,915,631 B2
(45) Date of Patent: Feb. 9, 2021

(54) DEEP LEARNING ON EXECUTION TRACE DATA FOR EXPLOIT DETECTION

(71) Applicant: Intel Corporation, Santa Clara, CA (US)

(72) Inventors: Li Chen, Hillsboro, OR (US); Salmin Sultana, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 15/922,868

(22) Filed: Mar. 15, 2018

(65) Prior Publication Data

US 2019/0042745 A1 Feb. 7, 2019

Related U.S. Application Data

(60) Provisional application No. 62/611,312, filed on Dec. 28, 2017.

(51) Int. Cl.
*G06F 21/56* (2013.01)
*G06N 3/08* (2006.01)
(Continued)

(52) U.S. Cl.
CPC ............ *G06F 21/566* (2013.01); *G06F 21/54* (2013.01); *G06F 21/552* (2013.01); *G06K 9/325* (2013.01); *G06K 9/4628* (2013.01); *G06K 9/6256* (2013.01); *G06K 9/6262* (2013.01); *G06N 3/0454* (2013.01); *G06N 3/08* (2013.01);
(Continued)

(58) Field of Classification Search
CPC ...... G06F 21/56; G06F 21/552; G06F 21/556; G06K 9/325; G06K 9/6256; G06K 9/6262; G06K 9/4628; G06N 3/0445; G06N 3/0454
See application file for complete search history.

(56) References Cited

U.S. PATENT DOCUMENTS 9,563,843 B2 * 2/2017 Yufik ................... G06N 3/08
2016/0247066 A1 * 8/2016 Yufik ................... G06N 3/08
(Continued)

OTHER PUBLICATIONS

"CS231n Convolutional Neural Networks for Visual Recognition," printed on Feb. 20, 2018 from http://cs231n.github.io/transfer-learning/, 4 pages.
(Continued)

*Primary Examiner* — Amir Mehrmanesh
(74) *Attorney, Agent, or Firm* — Alliance IP, LLC

(57) ABSTRACT

Technologies disclosed herein provide for converting a first data of a first control flow packet to a first pixel, where the first data indicates one or more branches taken during a known execution of an application, generating an array of pixels using the first pixel and one or more other pixels associated with one or more other control flow packets generated from the known execution, transforming the array of pixels into a series of images, and using a machine learning algorithm with inputs to train a behavior model to identify a malicious behavior in an unknown execution of the application. The inputs include one or more images of the series of images and respective image labels assigned to the one or more images. More specific embodiments include extracting the first control flow packet from an execution trace representing at least part of the known execution.

20 Claims, 16 Drawing Sheets

(51) Int. Cl.
  *G06K 9/62* (2006.01)
  *G06F 21/54* (2013.01)
  *G06F 21/55* (2013.01)
  *G06K 9/32* (2006.01)
  *G06K 9/46* (2006.01)
  *G06N 3/04* (2006.01)
  *G06N 20/10* (2019.01)

(52) U.S. Cl.
  CPC ...... *G06F 2221/034* (2013.01); *G06N 3/0445* (2013.01); *G06N 3/0472* (2013.01); *G06N 20/10* (2019.01)

(56) References Cited

U.S. PATENT DOCUMENTS

| | | | |
|---|---|---|---|
| 2018/0095764 | A1 | 4/2018 | Sultana et al. |
| 2018/0365573 | A1 | 12/2018 | Sultana |
| 2019/0042743 | A1* | 2/2019 | Chen ..................... G06F 21/563 |
| 2019/0065859 | A1* | 2/2019 | Togashi ........... G08B 13/19604 |
| 2019/0141353 | A1* | 5/2019 | Michelini ............... H04N 19/63 |
| 2019/0220605 | A1* | 7/2019 | Kounavis ................ G06F 21/60 |
| 2019/0272375 | A1* | 9/2019 | Chen ..................... G06N 3/0454 |

OTHER PUBLICATIONS

Abadi, Martin, et al., "Control-Flow Integrity, Principles, Implementations, and Applications," ACM Journal Name, vol. V, No. N; Feb. 2007; 41 pages.

Carlini, Nicholas, et al.; "Control-Flow Bending: On the Effectiveness of Control-Flow Integrity," Proceedings of the 24th USENIX Security Symposium; Washington, D.C.; Aug. 2015; 16 pages.

Carlini, Nicholas, et al.; "ROP is Still Dangerous: Breaking Modern Defenses," Proceedings of the 23rd USENIX Security Symposium; San Diego, California; Aug. 20, 2014; 16 pages.

Carlini, Nicholas, et al.; "Towards Evaluating the Robustness of Neural Networks," IEEE Symposium on Security and Privacy (SP); Mar. 22, 2017; 19 pages.

Chen, Li, et al.; "HeNet: A Deep Learning Approach on Intel Processor Trace for Effective Exploit Detection," accessed on the internet at arXiv:1801.02318v1; Jan. 8, 2018; 7 pages.

Dahl, George, et al., "Large-scale Malware Classification Using Random Projections and Neural Networks", 2013 IEEE International Conference on Acoustics, Speech and Signal Processing; May 26-31, 2013; 5 pages.

Davis, et al., "Deep Learning on Disassembly Data", Black Hat USA 2015, Dec. 29, 2015, 39 pages.

Demme, John, et al.; "On the Feasibility of Online Malware Detection with Performance Counters," ACM Sigarch Computer Architecture News; Jul. 2013; 12 pages.

Goodfellow, Ian J., "Explaining and Harnessing Adversarial Examples," International Conference on Learning Representations; San Diego, California; Mar. 20, 2015; 11 pages.

Grosse, Kathrin, et al., "Adversarial Perturbations Against Deep Neural Networks for Malware Classification," accessed on the internet at arXiv:1606.04435v2; Jun. 16, 2016; 12 pages.

He, Kaiming, et al.; "Deep Residual Learning for Image Recognition," accessed on the internet at arxiv:1512.03385v1; Dec. 10, 2015; 12 pages.

Hu, Weiwei, et al., "Black-Box Attacks against RNN based Malware Detection Algorithms," accessed on the internet at arXiv:1705.08131v1; May 23, 2017; 10 pages.

Huang, Wenyi, et al., "MtNet: A Multi-Task Neural Network for Dynamic Malware Classification," accessed on the internet at https://www.microsoft.com/en-us/research/publication/mtnet-multi-task-neural-network-dynamic-malware-classification/; Jul. 7, 2016; 20 pages.

INTEL; "Processor Trace Training," version dated Nov. 6, 2017; 120 pages.

James R.; "INTEL—Processing Tracing," published Sep. 18, 2013; 9 pages.

Kim, Gyuwan, et al., "LSTM-Based System-Call Language Modeling and Robust Ensemble Method for Designing Host-Based Intrusion Detection Systems", accessed on the internet at arXiv:1611.01726v1; Nov. 6, 2016; 12 pages.

Kolosnjaji, Bojan, et al., "Deep Learning for Classification of Malware System Call Sequences", accessed at the internet at https://link.springer.com/chapter/10.1007/978-3-319-50127-7_11; Nov. 29, 2016; 12 pages.

Lecun, Yann, et al.; "Gradient-Based Learning Applied to Document Recognition," Proceedings of the IEEE, Nov. 1998; 46 pages.

McAfee; "Advanced Threat Defense," Nov. 2017; 4 pages.

McAfee; McAfee Labs Threat Report, Dec. 2017, 13 pages.

McAfee; McAfee Labs Threats Report: May 2015; 2018; 4 pages.

Moosavi-Dezfooli, Seyed-Mohsen, et al.; "DeepFool: A Simple and Accurate Method to Fool Deep Neural Networks," accessed on the internet at arxiv:1511.04599v3; Jul. 4, 2016.

Moosavi-Dezfooli, Seyed-Mohsen, et al.; "Universal Adversarial Perturbations," IEEE Conference on Computer Vision and Pattern Recognition (CVPR), Mar. 9, 2017; 11 pages.

Nataraj, L. et al.; "Malware Images: Visualization and Automatic Classification," Proceedings of the 8th International Symposium on Visualization for Cyber Security; Pittsburgh, Pennsylvania; Jul. 20, 2011; 7 pages.

Nataraj, Lakshmanan, et al.; "A Comparative Assessment of Malware Classification using Binary Texture Analysis and Dynamic Analysis," Proceedings of the 4th ACM workshop on Security and Artificial Intelligence; Chicago, Illinois; Oct. 21, 2011; 10 pages.

Ozsoy, Meltem, et al.; "Malware-Aware Processors: A Framework for Efficient Online Malware Detection," HPCA 2015, San Francisco, California; Feb. 2015; 23 pages.

Pan, Sinno Jialin, et al., "A Survey on Transfer Learning," IEEE Transactions on Knowledge and Data Engineering, vol. 22, Issue: 10, Oct. 2010, 15 pages.

Pascanu, Razvan, et al.; "Malware Classification with Recurrent Networks," IEEE International Conference on Acoustics, Speech, and Signal Processing; Brisbane, Australia; Apr. 2015; 5 pages.

Raff, Edward, et al.; "Learning the PE Header, Malware Detection with Minimal Domain Knowledge", ACM AISec'17, Proceedings of the 10th ACM Workshop on Artificial Intelligence and Security, https://doi.org/10.1145/3128572.3140442, Nov. 3-3, 2017, 18 pages.

Raff, Edward, et al.; "Malware Detection by Eating a Whole EXE", accessed on the internet at arXiv:1710.09435v1; Oct. 25, 2017; 13 pages.

Rosenberg, Ishai, et al., "Generic Black-Box End-to-End Attack against RNNs and Other API Calls Based Malware Classifiers," accessed on the internet at arXiv:1707.05970v1; Jul. 19, 2017; 15 pages.

Saxe, Joshua, et al., "Deep Neural Network Based Malware Detection Using Two Dimensional Binary Program Features", accessed on the internet at http://arxiv.org/abs/1508.03096v2; Sep. 3, 2015; 10 pages.

Simonyan, Karen, et al.; "Very Deep Convolutional Networks for Large-Scale Image Recognition," International Conference on Learning Representations (ICLR 2015), Apr. 10, 2015; 14 pages.

Sun, Chong, et al.; "Chimera: Large-Scale Classification using Machine Learning, Rules, and Crowdsourcing," Proceedings of the VLDB Endowment, vol. 7, No. 13; 2014; 12 pages.

Symantec; Internet Security Threat Report ISTR, vol. 22, Apr. 2017, 77 pages.

Szegedy, Christian, et al.; "Going Deeper with Convolutions," accessed on the internet at arXiv:1409.4842v1; Sep. 17, 2014; 12 pages.

Szegedy, Christian, et al.; "Inception-v4, Inception-ResNet and the Impact of Residual Connections on Learning," accessed on the internet at arXiv:1602.07261v2; Aug. 23, 2016; 12 pages.

Szegedy, Christian, et al.; "Rethinking the Inception Architecture for Computer Vision," accessed on the internet at arXiv:1512.00567v3; Dec. 11, 2015; 10 pages.

Tang, Adrian, et al.; "Unsupervised Anomaly-Based Malware Detection Using Hardware Features," accessed on the internet at arXiv:1403.1631v2; Mar. 28, 2014; 12 pages.

(56) References Cited

OTHER PUBLICATIONS

Tilton, James C. et al.; "Refinement of a Method for Identifying Probable Archaeological Sites from Remotely Sensed Data," Proceedings of SPIE—The International Society for Optical Engineering; May 1, 2012; 11 pages.
Van Der Maaten, Laurens, et al.; "Visualizing Data Using T-SNE," Journal of Machine Learning Research 9; Nov. 2008; 27 pages.
Yosinski, Jason, et al.; "How Transferable are Features in Deep Neural Networks?", Neural Information Processing Systems 27 (NIPS '14), NIPS Foundation; Nov. 6, 2014; 14 pages.
"Ropper—rop gadget finder and binary information tool," available online at https://scoding.de/ropper (2013) (9 pages).
Le Dinh, Long, "ROPEME—ROP Exploit Made Easy," Blackhat USA, available online at https://github.com/packz/ropeme, (2010) (2 pages).
Quynh, Nguyen Anh, "OptiROP: The Art of Hunting ROP Gadgets," Proposal for Blackhat USA, available online at https://media.blackhat.com/us-13/US-13-Quynh-OptiROP-Hunting-for-ROP-Gadgets-in-Style-WP.pdf, (2013) (8 pages).
Salwan, Jonathan, "ROPGadget—Gadgets Finder and Auto-Roper," available online at http://shell-storm.org/project/ROPgadget/, at least as early as Mar. 12, 2011. (8 pages).
Elsabagh et al., "Detecting ROP with Statistical Learning of Program Characteristics," Mar. 2017, CODASPY '17: Proceedings of the Seventh ACM on Conference on Data and Application Security and Privacy, (pp. 219-226) (Year: 2017) (8 pages).
Roemer et al., "Return-Oriented Programming: Systems, Languages, and Applications," Mar. 2012, ACM Transactions on Information and System Security, vol. 15, No. 1, Article 2, all pages (Year: 2012) (42 pages).
USPTO Non-Final Office Action in U.S. Appl. No. 15/623,173 dated Jun. 23, 2020 (15 pages).

\* cited by examiner

DEEP LEARNING ON EXECUTION TRACE DATA FOR EXPLOIT DETECTION

CROSS-REFERENCE TO RELATED APPLICATION

This application claims the benefit of priority under 35 U.S.C. § 119(e) of U.S. Provisional Application Ser. No. 62/611,312, filed Dec. 28, 2017, entitled "DEEP LEARNING ON PROCESSOR TRACE DATA FOR EXPLOIT DETECTION," Inventors Li Chen et al. The disclosure of the prior provisional application is considered a part of and is incorporated by reference in its entirety in the disclosure of this application.

TECHNICAL FIELD

This disclosure relates in general to the field of computer systems and, more particularly, to computer security using deep learning on execution trace data for exploit detection.

BACKGROUND

Malware has evolved significantly over the past few years, evidenced by the high volume and complexity of attacks. Some security threat reports indicate that over one million malware variants hit the Internet each day. Traditional signature-based malware detection techniques can be ineffective on certain types of attack techniques such as, for example, code obfuscation and polymorphism used to automate writing new malware variants and zero-day exploits. In addition, code-reused based advanced control flow attacks are one of the predominant types of memory exploits today, and are not effectively mitigated by traditional malware detection techniques. Consequently, more effective techniques are needed for automated detection and classification of malware.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

Figure 1:
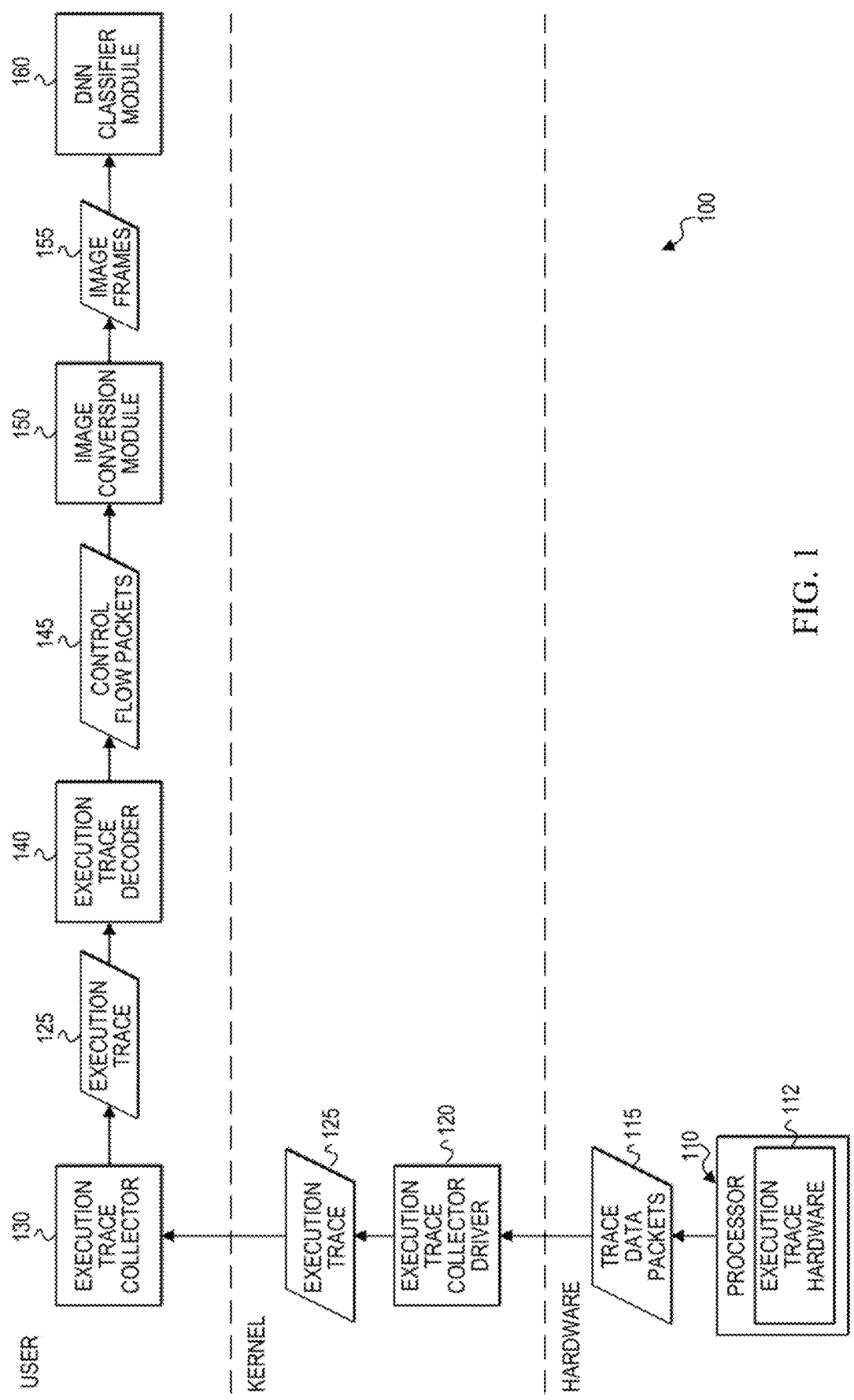
FIG. 1 is a simplified block diagram illustrating example components of a deep learning and malware detection system according to at least one embodiment of the present disclosure.

The following disclosure provides various possible embodiments, or examples, for implementing deep learning on control flow data of an application execution in order to detect exploits in a computing system. In an embodiment, a device may be configured with a computing platform that includes hardware capable of producing control flow information of an application execution. In one example, this hardware includes Intel® Processor Trace (PT) offered by Intel Corporation of Santa Clara, Calif. Intel® PT can generate processor trace packets containing control flow data of an application execution. The control flow data can be used to classify benign and malicious executions of an application. Based on this classification, the system can distinguish between benign and malicious control flow data and, accordingly, can detect control flow, camouflaged, or data oriented programming (DOP) attacks, among others.

For purposes of illustrating the several embodiments that enable deep learning on control flow data of an application execution on a computing system, it is important to first understand possible malware activities that may occur in the computing system. Accordingly, the following foundational information may be viewed as a basis from which the present disclosure may be properly explained.

Code-reuse based advanced control flow attacks are the predominant category of memory exploits today. These attacks exploit a memory vulnerability to hijack the control flow of a program and then download and run the malware. More recently, attackers tend to run camouflaged attacks that, instead of launching one-time attacks, implant malicious payloads into benign applications and execute concurrently under the cover of benign processes. While defenses have been developed against various code reuse attacks (e.g., return-oriented programming (ROP), call-oriented programming (COP)), there are more complex variants (e.g., jump-oriented programming (JOP), counterfeit object-oriented programming (COOP), etc.) that are still dangerous. Moreover, as defenses to control flow attacks gain adoption, potential memory exploits remain. For instance, attacks targeting non-control data in memory can exhibit information leakage or privilege escalation. Data-oriented programming (DOP) is a systematic technique that uses data plane values for malicious purposes, while maintaining complete control flow integrity.

Machine learning algorithms have been used for some behavioral analysis of malware executions, based on system calls, Portable-Executable (PE) header analysis, etc. Deep learning is a type of machine learning that uses a layered structure of algorithms, known as artificial neural networks (or ANNs), to learn and recognize patterns from data representations. ANNs are generally presented as systems of interconnected "neurons" which can compute values from inputs. ANNs represent one of the most relevant and widespread techniques used to learn and recognize patterns. Consequently, ANNs have emerged as an effective solution for intuitive human/device interactions that improve user experience, a new computation paradigm known as "cognitive computing." Among other usages, ANNs can be used for imaging processing, voice and object recognition or natural language processing. Convolution Neural Networks (CNNs) and Deep Belief Networks (DBNs) are just a few examples of computation paradigms that employ ANN algorithms.

Existing deep learning based malware detection and classification systems learn features from static analysis of an executable file or runtime behavioral analysis. These neural network malware classifiers, however, are susceptible to adversarial inputs. For example, by crafting adversarial malware samples or application programming interface (API) call sequences, an attacker can mislead the malware classifier and achieve high misclassification rate without affecting the malware functionality. The proposed attacks are effective against many classifiers including recurrent neural network (RNN) variants, feed forward DNNs, and traditional machine learning classifiers such as support vector machine (SVM). Moreover, API call-based malware analysis also requires significant manual feature engineering to select the API calls most relevant to malware execution.

In an example, some systems implement machine learning based malware detection using hardware supported lower level features. For instance, one system uses CPU performance counters to model micro-architectural signatures of malware and detect variants of malware from known malware signatures. The underlying observation is that programs appear to be unique in time series behavior (e.g., L1 hits, arithmetic µOps executed, etc.), while variants of the same programs do similar things. The systems train a set of classifiers with the complete trace of program behavior by sampling various performance counters along with the process identifier of the currently executing program at every N-th cycle. The machine learning classifiers are applied at the granularity of thread and application to detect variants of known malware. In another example, a system advances the use of micro-architectural features in detecting malware exploitation in an anomaly-based detector. They utilize architectural events (LOAD, STORE, ARITH, BR, CALL, CALL_D, CALL_ID, RET) and micro-architectural events (LLC, MIS_LLC, MISP_BR, MISP_RET, MISP_CALL, MISP_BR_C, MIS_ICACHE, MIS_ITLB, MIS_DTLBL, MIS_DTLBS, STLB_HIT, % MIS_LLC, % MISP_BR, % MISP_RET) to build baseline models of benign programs to be protected and use these profiles to detect deviations that occur due to malware exploitation. In still another example, a system augments processors with an online hardware-based detector, MAP, to serve as the first line of defense to differentiate malware from legitimate programs and help the system prioritize how to apply more expensive software-based solutions. The MAP logic is located at the end of the processor pipeline after the instruction commit stage. A feature collection (FC) unit collects features like architectural events (taken and immediate branches, memory accesses, etc.), memory addresses (histogram of frequency of memory address distance, etc.), and executed instructions (frequency of various instructions/opcodes, etc.) and sends them to a Prediction Unit (PU). The PU classifies the collected feature vector once every 10,000 instructions and sends the predictions to an Online Detection (OD) module. The OD module applies a time series algorithm to make a decision about the process.

Other malware detection methods may be designed evaluate processor trace packets generated by Intel® Processor Trace (PT) to detect malware. Intel® PT is a hardware feature that records control flow information of an application execution, including instruction pointer, indirect branch targets, etc. and facilitates time series analysis, instruction-granular analysis, etc. of executions. Because it is a hardware feature, Intel® PT has visibility to all the instructions executed on the CPU and thus, provides the complete control flow history of an application execution. This capability of Intel® PT makes it suitable for baremetal malware analysis able to detect evasive malware that can bypass Virtual Machine or Sandbox based malware detection.

Some malware detection systems may utilize processor trace data by manually matching the packets of the current traces with the legitimate packets in the database. If there is a mismatch, then a threat is identified. This type of deterministic solution is usually accurate. However, given the huge amount of processor trace data, which may be generated for an executing application, it is almost impossible to do deterministic comparison at runtime. Furthermore, deterministic solutions are not scalable to a large amount of trace data provided by the system. Although a manual or deterministic comparison can detect attacks, such methods are not scalable to a large amount of processor trace data or detection at runtime.

A deep learning and malware detection system 100, as shown in FIG. 1, resolves many of the aforementioned issues (and more). Deep learning and malware detection system 100 may utilize artificial intelligence, machine learning, and deep learning to implement an execution trace-based security solution, while addressing the scalability issue (and other example issues) as identified above. For instance, a deep neural network (DNN) model may be used to classify benign and malicious executions. This solution works even when the attacker changes or adds noise to its attack code. Such a solution may additionally deal with control flow, non-control data attacks, and even camouflaged attacks.

In one example, deep learning and malware detection system 100 is an intelligent system that implements a lightweight image conversion of execution trace data to efficiently detect attacks. One or more hierarchical ensemble deep learning algorithms may be used to classify benign and malicious executions of an application. The control flow packets (e.g., in an execution trace) may be converted to a stream of pixels, and a per-application deep-learning behavior model may be trained on segmented sequences of pixels to characterize benign and malicious executions. At run time, the trained and validated behavior model produces scoring for each segmentation. The final decision is based on an ensemble voting scheme. Since there may be noise in the training data, the parameters may be cross-validated in the voting scheme to reduce false positive rate.

Security products may be implemented using such a system to enhance malware detection functionality by efficiently and accurately detecting control flow exploits using, for instance, Intel's hardware capability, Processor Trace. Furthermore, this approach may be combined with other security solutions to provide a holistic approach to detect malware activity on computing platforms. In some embodiments, a system disclosed herein to enhance malware detection functionality by detecting control flow exploits may use deep inception transfer learning on an execution trace, such as Intel hardware Processor Trace, and enable effective threat detection. In other embodiments, a system disclosed herein may train a deep learning algorithm from scratch to effectively detect control flow exploits in an execution trace. Embodiments of systems disclosed herein may have higher classification accuracy and lower false positive rates than classical machine learning (ML) algorithms, while reducing the cost of feature engineering, because it is based on deep learning. In particular, pixel conversion used on control flow data in the system results in minimal to no loss of information from converting the raw execution trace data into a time series of images for machine learning and malware detection. Furthermore, such a system can address the issue of noisy training labels and select the optimal parameters for more robust threat detection and improved false positive rate, among other example advantages.

FIG. 1 illustrates deep learning and malware detection system 100 for training a behavior model and using the trained behavior model to distinguish malicious execution and detect an attack. System 100 includes a user space, a kernel, and hardware. The hardware includes a central processing unit (CPU) 110 with execution trace hardware 112. The kernel includes an execution trace collector driver 120. The user space includes an execution trace collector 130, an execution trace decoder 140, an image conversion module 150, and a deep neural network (DNN) classifier module 160. Trace data packets 115 flow from processor 110 to execution trace collector driver 120. An execution trace 125 containing control flow packets, flows from execution trace collector driver 120 in the kernel to execution trace collector 130 of the user space. In at least some embodiments, execution trace 125 may also contain other trace data packets in addition to the control flow packets. Execution trace 125 is passed from execution trace collector 130 to execution trace decoder 140. A sequence of control flow packets 145 are extracted by execution trace decoder 140 and passed to image conversion module 150. Image frames 155 are generated by image conversion module 150 and passed to DNN classifier module 160. Image frame 155 may be in the form of a time series of images in at least one embodiment.

A brief discussion is now provided about some of the possible infrastructure that may be associated with deep learning and malware detection system 100. System 100 may be provisioned in any computing device capable of capturing information about software execution on hardware threads. This captured information is also referred to herein as 'trace data.' Trace data contains control flow data of the application execution, such as timing and program flow information (e.g., branches taken or not taken indications, branch targets). The trace data may also contain program-induced mode related information (e.g., state transitions, control register changes).

As used herein, a 'computing device' in which deep learning and malware detection system 100 may be implemented, can include, but is not necessarily limited to, a mobile device (e.g., smart phone, table, phablet, eBook reader, etc.), a personal computer, a laptop, a gaming system, an infotainment system in a vehicle (e.g., automobile, airplane, train, bus, subway, etc.), a wearable electronic device, an embedded device, and any other component, element, or object operable to generate control flow data of an application execution. In other implementations, device 200 may include network elements such as servers, appliances, routers, processors, processing systems, or any other suitable component, element, or object operable to exchange information in a network environment and to generate control flow data of an application execution.

In an embodiment, processor 110 is a system processor provisioned with execution trace hardware 112 that can capture control flow data of an application execution and generate control flow packets containing the captured control flow information. A sequence of packets generated by the execution trace hardware and containing at least the captured control flow data related to an application execution is referred to herein as an 'execution trace.' In one example, the Intel® Processor Trace (PT) feature may be implemented as execution trace hardware 112 of processor 110. Alternatively, any other suitable hardware capable of producing control flow packets for an application execution could be used. Execution trace hardware 112 can be configured to monitor an application at runtime to capture execution trace data that includes control flow information of the application execution, including instruction pointer, indirect branch targets, conditional branches decisions, etc. and facilitate time series analysis, instruction-granular analysis, etc. of executions. Hardware based execution traces are unforgeable and hence, provide the complete control flow history of an application execution.

Both benign and malicious execution traces of an application can be used to train a behavior model in accordance with embodiments of deep learning and malware detection system 100. An execution trace is referred to as 'benign' when it is generated based on the execution of a benign version of an application (i.e., without malware). An execution trace is referred to as 'malicious' when it is generated based on the execution of an application that is exploited to carry out an attack.

In the kernel of system 100, trace data collector driver 120 may interact with and configure execution trace hardware 112. Driver 120 receives trace data packets 115 generated by execution trace hardware 112. These trace data packets may be provided to the kernel as they are generated. Execution trace data collector 130 is a user space application that interacts with execution trace data collector driver 120 to configure and collect runtime execution trace data for a monitored application. Execution trace data collector 130 receives an execution trace 125, which contains trace data packets 115, from execution trace data collector driver 120. In some scenarios, execution trace 125 may contain all of the trace data packets generated during an application execution. During the training phase, for example, the application may complete execution before the execution trace is provided to the user space for training. In other scenarios, each execution trace 125 provided to execution trace data collector 130 may contain a different portion of trace data packets generated during the application execution. During the detection phase, for example, multiple sequential execution traces may be provided to execution trace collector 130 during the execution of an application.

Execution trace decoder 140 is a user space application that receives the raw execution trace 125 from execution trace collector 130. In some implementations, execution trace 125 may contain a sequence of packets that could have the same and/or different types of information. Execution trace decoder decodes execution trace 125 and extracts sequences of packets that indicate control flow at branches (e.g., indirect branches, conditional branches) of the application execution. In one example, control flow packets can include Taken Not-Taken (TNT) packets and target IP (TIP) packets. A TIP packet represents the control flow transfer at an indirect branch to the target address in the payload. A Taken Not-Taken (TNT) packet contains a number of conditional branches, where each bit represents the control flow transfer at a conditional branch. If a conditional branch is taken during execution, a bit of value of 1 is recorded in a TNT packet. Otherwise, the bit is recorded as a 0.

Execution trace decoder 140 can extract the TIP and TNT packets. In one embodiment, the TIP and TNT packets may be provided to image conversion module 150. In another embodiment, execution trace decoder 140 may extract data from the packets (e.g., memory addresses from TIP packets, one or more payload bytes from long TNT packets, one byte from short TNT packets) and provide this information to image conversion module 150. For example, indirect branch targets may be extracted from TIP packets. In some implementations, some random binary information may also be extracted to be used in converting the TIP packets to pixels.

Image conversion module 150 is a data pre-processing component that receives extracted control flow packets 145 (or extracted bytes from the control flow packets) for conversion to an area of pixels. A pixel is the smallest controllable element in a raster image. Each pixel value is between 0 and 255. In one example, image conversion module 150 converts the control flow packets or portions of the control flow packets to a one-dimensional array of pixels. To accommodate the high volume of data, the pixel array can be segmented into N sub-arrays. Each pixel segmented sequence is transformed to a gray-scale image. Each gray-scale image can be replicated three times. As a result, each behavior (e.g., indirect branches, conditional branches) is a 3-channel image, denoting a segmented behavior of the execution trace. Thus, image conversion module 150 converts the execution trace to a time series of images, indicated as image frames 155 in FIG. 1.

DNN classifier module 160 is a user space component that receives image frames 155 generated by image conversion module 150. DNN classifier 160 applies convolutional neural network (CNN) on the embedded data for classification. In a training flow, DNN classifier module 160 conducts transfer learning on the time series of images to train the benign/malicious behavior model. The time series of images and benign/malicious labels of the images can be used as input for the CNN. A low-level behavior model that characterizes benign or malicious behaviors on each trace segment (i.e., each image) can be generated. In a detection (or runtime) flow, the DNN classifier module uses the trained behavior model to detect an exploit based on an anomaly in the execution.

Figure 2:
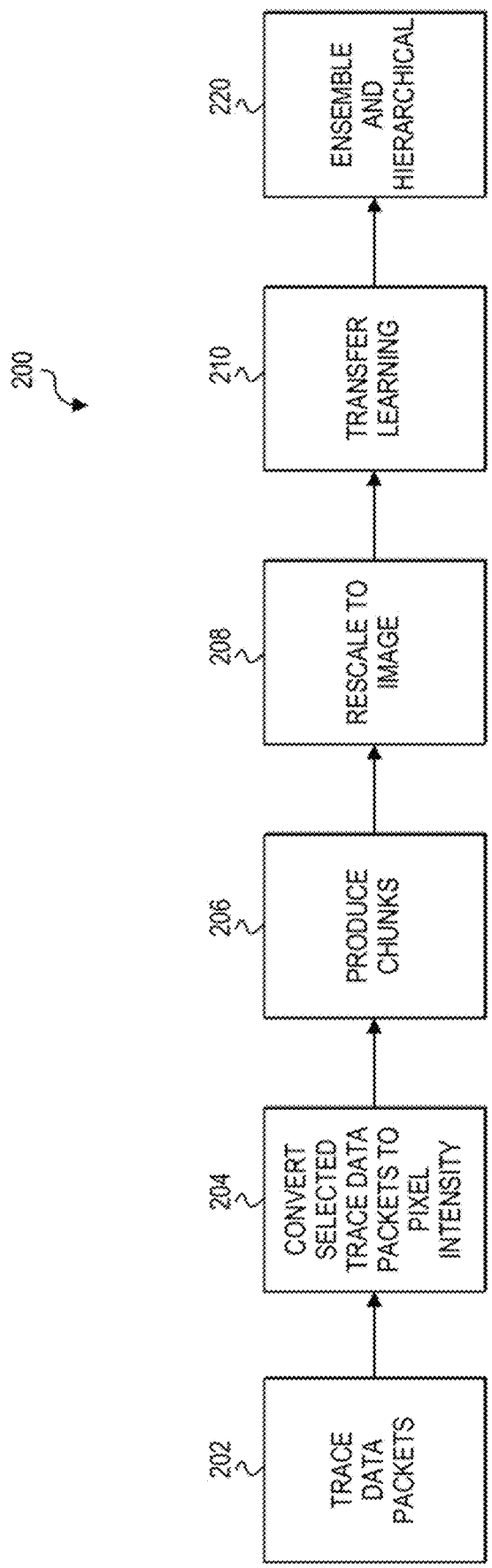
FIG. 2 is a simplified block diagram illustrating an example pipeline of a deep learning and malware detection system according to at least one embodiment.

FIG. 2 illustrates a block diagram showing an example implementation of a deep learning pipeline 200, which may be implemented by an example system, such as deep learning and malware detection system 100. The example system may treat exploit detection as a probabilistic classification problem where the goal is to label an execution benign or malicious. In at least one embodiment, deep learning pipeline 200 represents functions to facilitate hierarchical ensemble deep learning to classify an incoming execution trace as benign or malicious. Because the system may be hierarchical in nature, the system may first build a fine-granularity behavior model for a given application. At runtime, the incoming execution trace is segmented into a sequence of time series images and scored at each segmentation. The final decision is based on an ensemble of scores provided by the behavior model. Essentially the deep learning pipeline has the following three main processes: 1) Preprocessing and segmentation, 2) Build deep learning based behavior model, and 3) Dynamic ensemble classification.

In the preprocessing and segmentation process, deep learning pipeline 200 may include trace data packets stage 202 that are generated from a system processor (e.g., processor 110), convert selected trace data packets (e.g., control flow packets) to pixel intensity stage 204, produce chunks (or segments) stage 206, and rescale the chunks to an image stage 208. The build deep learning based behavior model process may include a transfer learning stage 210 to train a model. The dynamic ensemble classification process may include an ensemble and hierarchical stage 220 to produce classification results on whether the selected trace data packets indicate an attack.

Figure 3:
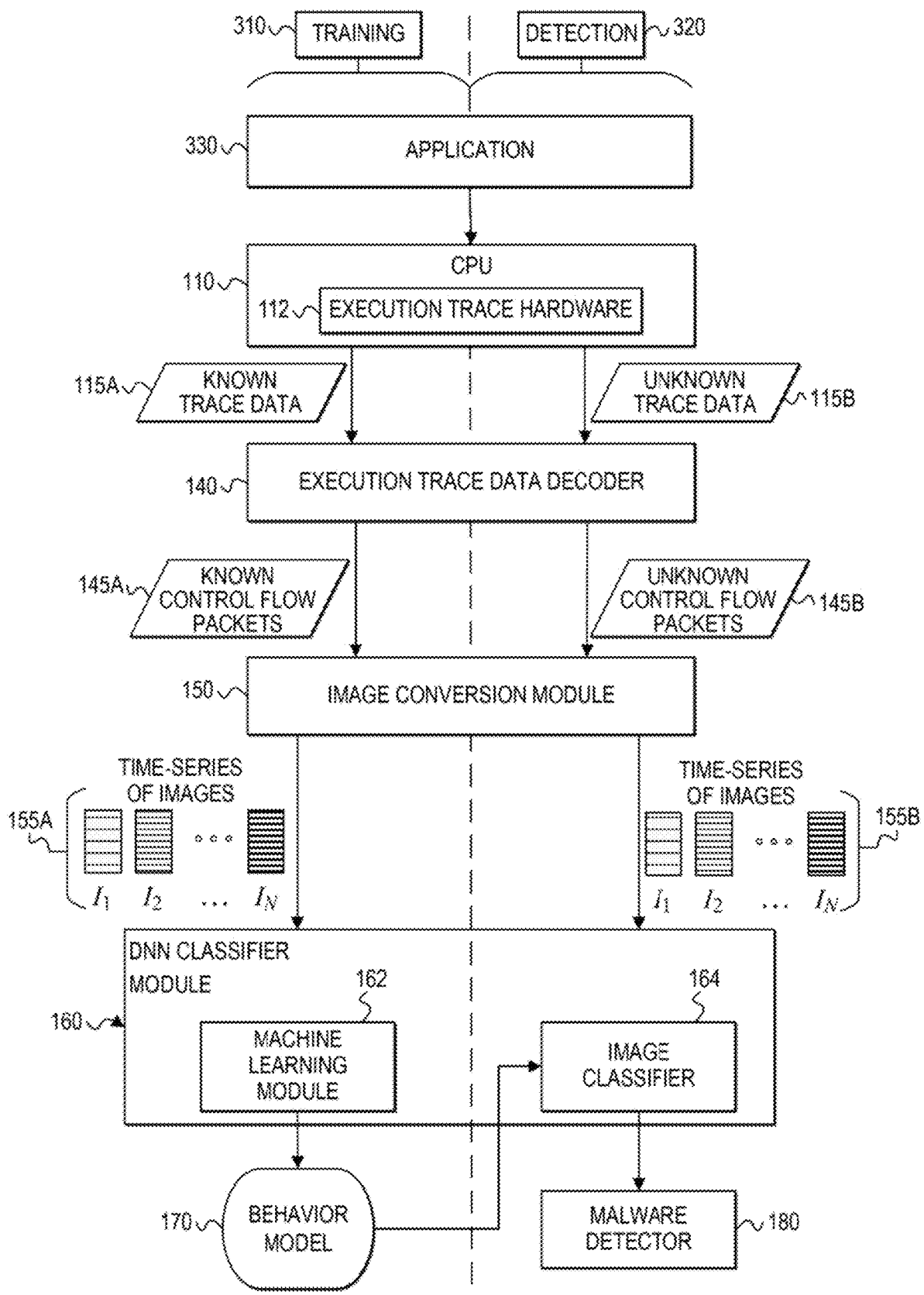
FIG. 3 is a simplified block diagram illustrating example training and detection flows associated with components of a deep learning and malware detection system according to at least one embodiment.

FIG. 3 illustrates selected portions of the architecture of deep learning and malware detection system 100 and flows that may be applied to the architecture according to one or more embodiments. The illustrated architecture includes processor 110 with execution trace hardware 112, execution trace data decoder 140, image conversion module 150, and DNN classifier module 160. In addition, the architecture includes a malware detector 180. DNN classifier module 160 includes a machine learning module 162 and an image classifier 164.

FIG. 3 illustrates an example training flow 310 and an example detection flow 320 of deep learning and malware detection system 100. During training flow 310, a behavioral model is trained on known benign samples and known malicious samples of an application, such as application 330. Accordingly, during training flow 310, known trace data 115A is generated by execution trace hardware 112. When trace data decoder 140 receives the known trace data 115A, known control flow packets 145A are extracted and provided to image conversion module 150.

During detection flow 320, the behavioral model trained during the training flow 310 is used to determine whether an executing application, such as application 330, is under attack. Accordingly, during detection flow 330, unknown trace data 115B is generated by execution trace hardware 112. When trace data decoder 140 receives the unknown trace data 115B, which may be in the form of an execution trace containing trace data packets, unknown control flow packets 145B are extracted and provided to image conversion module 150.

Control flow packets in an execution trace may be used to characterize an execution. Accordingly, in one or more embodiments, image conversion module 150 converts control flow packets (e.g., 145A or 145B) to a time series of images (e.g., 155A or 155B), which characterize the execution of the application (e.g., 330). In at least one embodiment, the process to convert control flow packets to a time series of images is the same regardless of whether the control flow packets are known control flow packets generated during a training flow (e.g., 310) or unknown control flow packets generated during a detection flow (e.g., 320). In at least one embodiment, the control packets may include Taken Not-Taken (TNT) packets and/or Target IP (TIP) packets. Initially, a lightweight conversion may be performed to convert the TNT and TIP packets to a stream of pixels. Each pixel value is between 0 and 255. Specific example processes for converting TNT packets and TIP packets to a time series of images will now be described.

A Taken Not-Taken (TNT) packet contains a number of conditional branches, where each bit represents the control flow transfer at a conditional branch. If a conditional branch is taken during execution, a bit of value of 1 is recorded in a TNT packet. Otherwise, the bit is recorded as a 0. As shown in FIGS. 4 and 5, in one example, pixel conversion may be utilized using two variants of TNT packets: (1) Short TNT packet of one byte, (2) Long TNT packet of up to eight bytes.

Figure 4A:
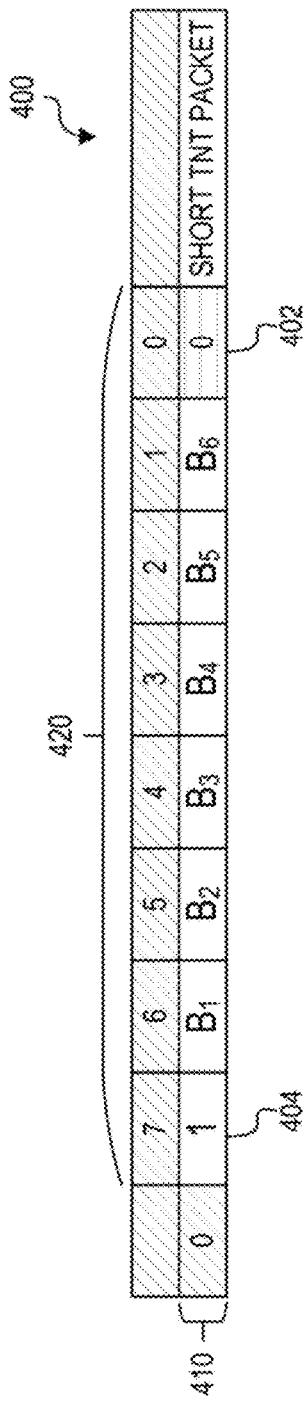
FIG. 4A is an illustration of an example format of a short Taken Not-Taken (TNT) control flow packet according to at least one embodiment.
Figure 5:
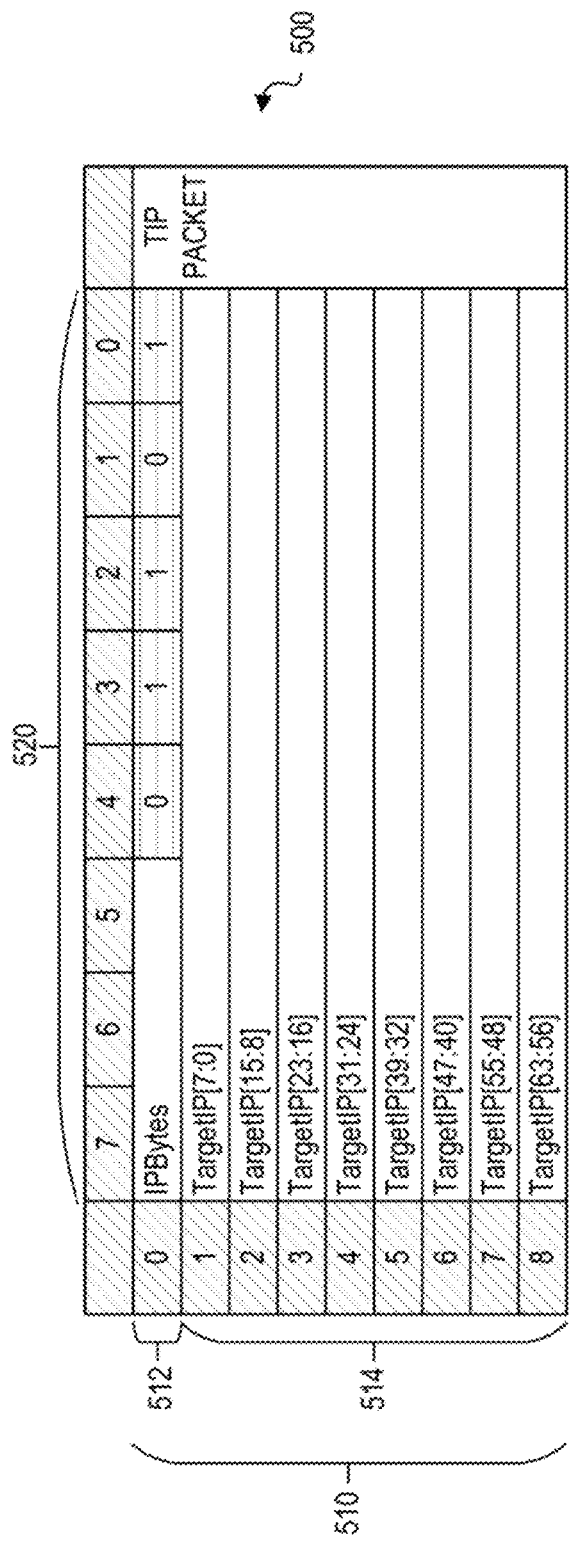
FIG. 5 is an illustration of an example format of a Target Internet Protocol (TIP) control flow packet according to at least one embodiment.

FIG. 4A shows an example short TNT packet format 400 of one byte. Row 410 indicates the byte in a short TNT packet and columns 420 indicate the bit positions within byte 410. A short TNT packet has the least significant bit 402 as a 1-bit header. The short TNT packet can contain from 1 to 6 TNT bits, designated as $B_1$-$B_6$ in FIG. 4A. The last valid TNT bit is followed by a trailing '1', or Stop bit. For example, a stop bit 404 is shown in short TNT packet format 400, based on the packet containing 6 TNT bits $B_1$-$B_6$. If a short TNT packet is not full (i.e., fewer than 6 TNT bits), the Stop bit moves up, and the trailing bits of the packet are each filled with a '0'. For a short TNT packet, the 1-byte packet may be converted to an unsigned 1-byte value representing one pixel intensity. This value can be between 0 and 255.

Figure 4B:
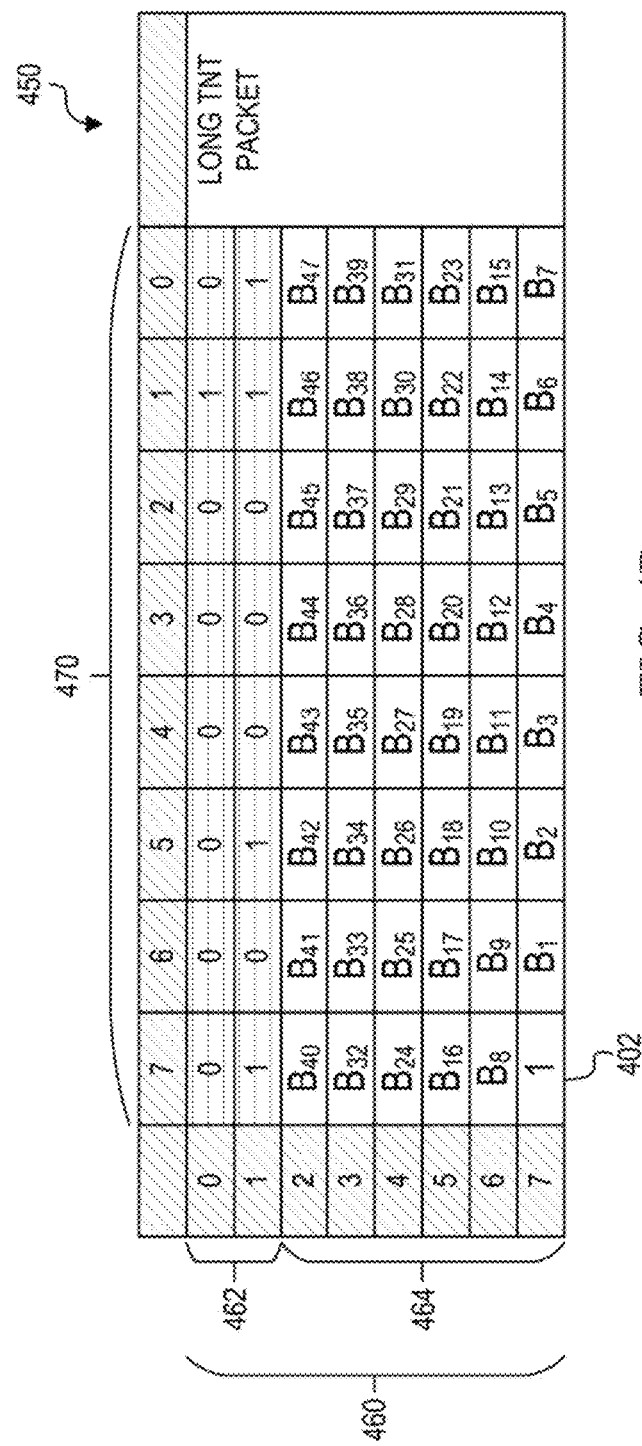
FIG. 4B is an illustration of an example format of a long Taken Not-Taken (TNT) control flow packet according to at least one embodiment.

FIG. 4B shows an example long TNT packet format 450 of up to eight bytes. Rows 460 indicate the bytes of a long TNT packet and columns 470 indicate the bit positions within the bytes. A long TNT packet has the least significant two bytes 462 as a 2-byte header. A payload 466 contains the most significant three to eight bytes. The long TNT packet can contain from 1 to 47 TNT bits in the payload, designated as $B_1$ ... $B_{47}$ in FIG. 4B. TNT bits $B_1$ ... $B_N$ represent the last N conditional branches, such that $B_1$ is oldest and $B_N$ is youngest. Accordingly, in short TNT packet 450, $B_1$ represents the oldest conditional branch and $B_{47}$ represents the youngest conditional branch. The last valid TNT bit is followed by a trailing '1', or Stop bit. For example, a stop bit 402 is shown in long TNT packet format 450, based on the packet containing 47 TNT bits $B_1$-$B_{47}$. If a long TNT packet is not full (i.e., fewer than 47 TNT bits), the Stop bit moves up, and the trailing bits of the packet are each filled with a '0'. For a long TNT packet, the 2-byte header 462 may be removed and the length of the packet payload may be determined. Each byte of payload 464 may be converted to an unsigned 1-byte value representing pixel intensity. This value can be between 0 and 255. Hence, a long TNT packet may generate from 1 to 6 pixels.

A TIP packet represents the control flow transfer at an indirect branch to the target address contained in the payload of the TIP packet. FIG. 5 represents an example TIP packet format 500. Rows 510 indicate the bytes of a TIP packet and columns 520 indicate the bit positions within the bytes. In one example shown in FIG. 5, the TIP packet has a 1-byte header 512 and up to an 8-byte payload 514. In 1-byte header 512, the least significant 5 bits (i.e., bits 0-4) are used to identify a TIP packet. The next 3 bits (i.e., bits 5-7), also referenced herein as an "IPBytes" field, indicate how the target address payload is compressed. Depending on the mode of compression, the size of target address (TargetIP) payload may vary from 0 to 8 bytes.

Figure 6:
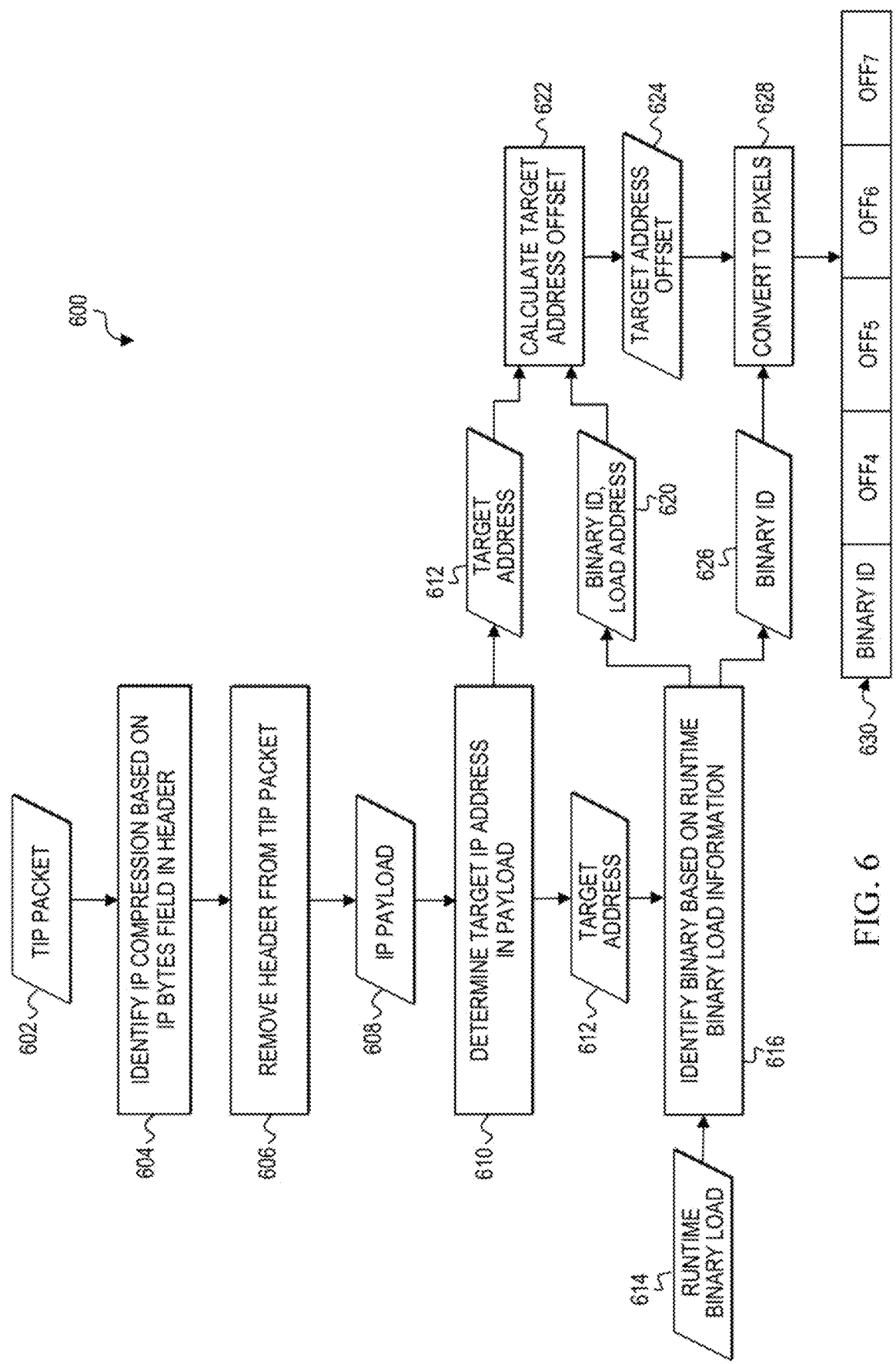
FIG. 6 is a simplified interaction diagram illustrating example operations associated with a deep learning and malware detection system according to at least one embodiment.

FIG. 6 is a simplified block diagram illustrating an example process 600 for converting a TIP packet to an array of 5 pixels. In this example process 600, target addresses contained in TIP packets are normalized to mitigate the effects of randomization of load addresses of binaries at runtime. For example, address space layout randomization (ASLR) is a memory-protection process that some operating systems use to guard against buffer-overflow attacks by randomizing the location where the binary is loaded into memory at runtime. Normalizing a target address mitigates the effect of randomization by ASLR and possibly other randomization techniques.

A TIP packet 602 is received by image conversion module 150. In some scenarios, the TIP packet payload may not contain a full target address. Instead, the target address may be in a compression mode (e.g., 2 or 4 bytes) in the payload. At 604, the particular IP compression (if any) is identified based on the IP bytes field in the header of the TIP packet. The system may remove the 1-byte header of the TIP packet and get an IP payload 608 from the TIP packet based on the identified IP compression mode. In one example of a compressed payload in a TIP packet, the target address of the indirect branch may be determined based on the last IP (i.e., target address determined for the previous TIP packet) and the compressed IP payload. In other scenarios, the TIP packet may contain an uncompressed payload (i.e., the full target address) and, therefore, the last IP is not needed to determine the target address. The target address 612 and runtime binary load information 614 may be used at 616 to identify the binary to which the target address belongs. Each binary may be identified with a 1-byte identifier (referred to herein as a 'binary ID').

To normalize the impact of load address randomization such as ASLR, the offset of the target address from the binary load address may be calculated at 622. The reconstructed target address 612, and the binary ID and identified load address 620 can be used at 622 to calculate an offset. The target address offset 624 and the binary ID 626 may be used to represent the normalized target address as a tuple of <binary ID, offset>. In at least one embodiment, the tuple is 5 bytes, with the binary ID being one byte and the offset being four bytes. At 628, the 5-byte tuple is converted to an array of 5 pixels, among other example implementations.

With reference again to FIG. 3, upon conversion of the TNT and TIP packets of an execution trace to pixels, image conversion module 150 converts the pixels (e.g., from short TNT packets and possibly some long TNT packets with 1-byte payloads) and arrays of pixels (e.g., from long TNT packets with multi-byte payloads and TIP packets) to a one-dimensional array of pixels. Thus, the execution trace is represented as a one-dimensional array of pixels. The array of pixels is denoted herein as X, where X has length L and each pixel is a value of 0 to 255, i.e., $X \in \{0, 255\}^L$.

Image conversion module 150 can divide the one-dimensional array into N arrays, or N segments, where each segment of the array has a length of $m^2$. In one example, each array has a length of 50,176, where m=224. If L is not a multiple of $m^2$, then the last segment is padded. Each segment is mapped to a two-dimensional array of size m-by-m and is represented as a gray-scale image. In at least one embodiment, each two-dimensional array is replicated to produce a 3-channel image. Accordingly, the pixel representation X of each trace is divided into a time series of images $\{I_1, I_2, \ldots I_N\}$, where each $I_k \in \{0, 255\}^{m \times m}$, and where $k \in \{1, 2, \ldots N\}$. This sequence-to-image resizing directly remaps the shape and thus, incurs no information loss.

DNN classifier module 160 receives the time series of images (e.g., 155A or 155B) generated from an execution trace. In at least one embodiment, DNN classifier module 160 applies a convolutional neural network (CNN) on the embedded data for classification. If the time series of images represents an execution trace during a training flow 310, such as time series of images 155A, then machine learning module 162 performs classification based on the images to train a behavior model of an application. If a time series of images represents an execution trace during a detection flow 320, such as time series of images 155B, then image classifier 164 applies the trained behavior model to the images to detect an exploit based on an anomaly in the execution.

In one example implementation, a behavior model 170 is built during multiple training flows 310. The behavior model is the finest-granularity model. This low-level model distinguishes benign and malicious behavior of an application execution. However, building a robust behavior DNN model may be difficult. For instance, from a machine learning (ML) perspective, one challenge lies in the noisy ground truth problem. Usually in supervised learning, an ML model is trained using labeled (or classified) data. The labels on the training data are assumed to be completely correct. The problem of noisy ground truth classification means that the labels on the training data are not fully correct and have noise. At the beginning of training by machine learning module 160, the system addresses the issue of potentially high false positive rates due to noisy training data. During detection, the system provides parameter optimization in which a parameter is added to reduce the false positive rate.

During training, an example system collects an execution trace for benign and malicious samples of an application. The training dataset of a low-level DNN behavior model comprises multiple time series of images, such as time series of images 155A. To provide labels of a time series of images, the original, pre-specified label for the corresponding execution trace is utilized. A benign execution trace data is always benign; hence the labels from a benign dataset can be considered all correct. For example, if execution trace $X^i$ is benign, then all segmented images $\{I^i_1, I^i_2, \ldots I^i_N\}$ are labeled as benign. A malicious execution trace, however, is not considered malicious until an attack has occurred. Before the attack, the execution trace still represents a benign execution. Hence, it is very possible that the ground truth for some of the supposedly malicious behaviors within an execution trace are actually benign. This can result in artificially high false positive rate.

An example system may overcome this issue by selecting the last t portion of the malicious execution trace for training. In at least one implementation, parameter t is specific to an execution trace and can indicate the percentage of the execution trace that is to be selected for training. This parameter t can be determined by either (1) identifying the location (e.g., memory address) in the execution trace that corresponds to the initiation of the malware attack, or (2) providing an estimate of the location in the execution trace that corresponds to the initiation of the malware attack. The parameter t can be the percentage of the execution trace defined by the identified (or estimated) location in the execution trace to the end of the execution trace. By way of example, if the location of the attack initiation is identified or estimated to have occurred halfway through the execution trace, then parameter t may be 0.5 (50%). The identified (or estimated) location in the execution trace can be used to identify a corresponding pixel in an image of the time series of images. The image containing the identified pixel and subsequent images in the time series of images can be labeled as malicious. Images in the time series that are prior to the image containing the identified pixel can be disregarded and omitted from the training dataset. In one example, application programming interface (API) calls may be employed to identify the location in the execution trace of the malware attack. The API call can be mapped to the address. To estimate a location of a malware attack, an API sequence can be examined and mapped back to a location in the execution trace. In addition, parameter t is adjustable during the training process because malware attacks in different execution traces may be initiated at different locations within those execution traces. As a result, the system can reduce the bias that a benign sample would be considered malicious.

Figure 7:
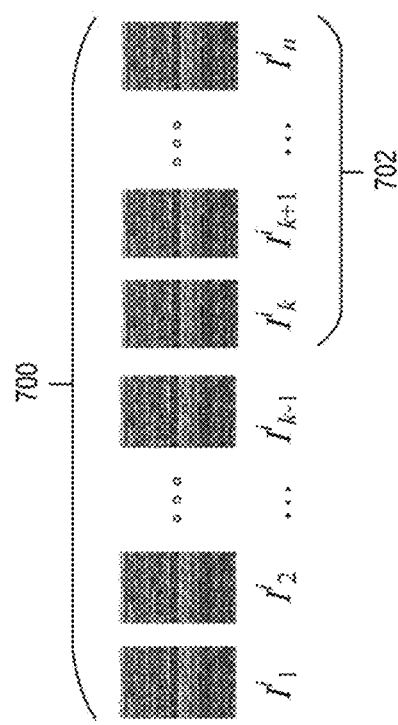
FIG. 7 is a representative illustration of an example of a time series of images generated by a deep learning and malware detection system according to at least one embodiment.

FIG. 7 illustrates a graphical representation of a possible time series of images 800 of a malicious execution trace $X^i$ in which noisy training data is mitigated according to at least one embodiment. Images 700 of the malicious execution trace $X^i$ include $\{I^i_1, I^i_2, \ldots I^i_N\}$. Parameter t is determined based on an identified location in the execution trace of an initiation of a malware attack. In FIG. 7, parameter k designates the image in the time series of images that contains a pixel corresponding to the identified location of the beginning of the malware attack in the execution trace $X^i$. Parameter t thresholding is applied to a portion 702 of malicious execution trace $X^i$, which includes images $\{I^i_k, I^i_{k+1}, \ldots I^i_N\}$. Thus, images $\{I^1_k, I^i_{k+1}, \ldots I^i_N\}$ are each labeled as malicious, whereas images $\{I^i_1, I^i_2, \ldots I^i_{k-1}\}$ are disregarded and omitted from the training dataset in at least one embodiment.

In some implementations, after processing, segmentation, and selecting the last t portion of segments from malicious traces, the training dataset may consist of both benign and malicious behaviors. Each behavior is originally an array of length 50,176, and the system transforms each behavior into a gray-scale image of 224×224 pixels. In some scenarios, the gray-scale image may be padded (e.g., to 299×299 pixels) to accommodate different types of neural networks. In at least one embodiment, the gray-scale channel (e.g., 224×224 or 299×299) is replicated three times. As a result, each behavior is represented by a 3-channel image, denoting a segmented behavior of an execution trace. Each execution trace is thus considered to contain a time series of images.

With reference again to FIG. 3, a time series of images (e.g., 155A or 155B) can be provided to DNN classifier module 160. In at least some embodiments, machine learning module 162 may function as a deep neural network (DNN) such as a convolutional neural network (CNN). Generally, a CNN includes input and output layers, in addition to many hidden layers. The hidden layers can include convolutional layers, pooling layers, and fully connected layers.

Figure 8:
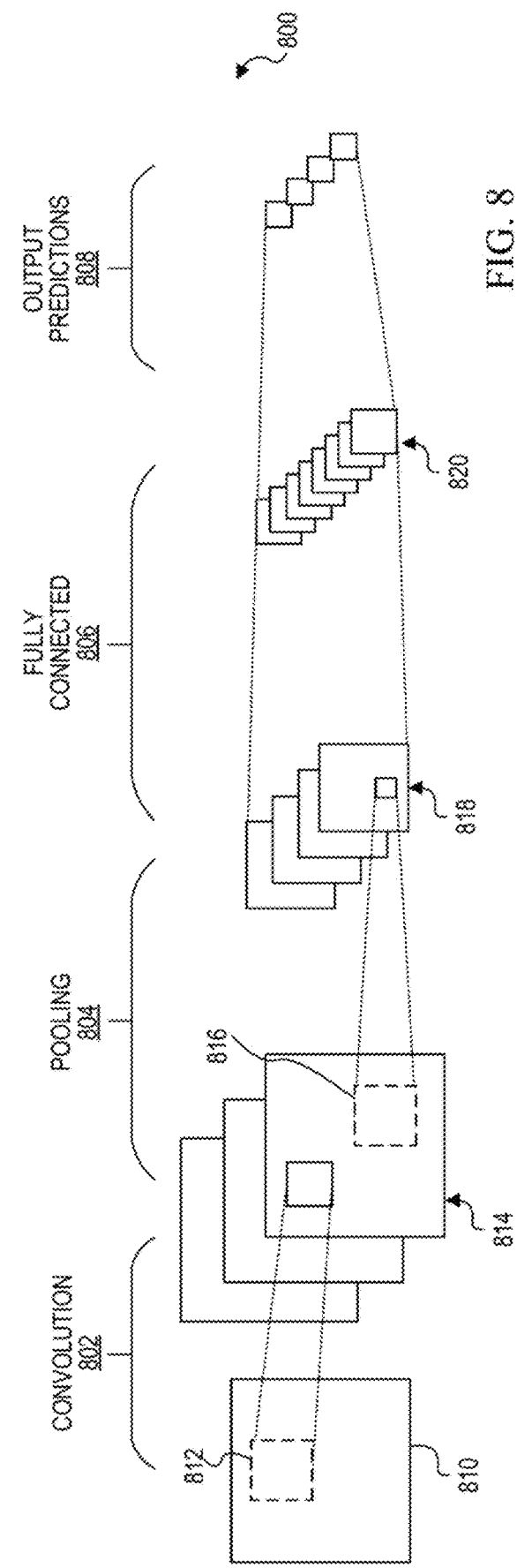
FIG. 8 illustrates an example of a deep neural network system according to at least on embodiment.

FIG. 8 illustrates a CNN system 800 that includes a convolution layer 802, a pooling layer 804, a fully-connected layer 806, and output predictions 808 in accordance with embodiments of the present disclosure. Each layer may perform a unique type of operation. The convolutional layers apply a convolution operation to the input in order to extract features from the input image and pass the result to the next layer. Features of an image can be extracted by applying one or more filters in the form of matrices to the input image, to produce a feature map (or neuron cluster). For example, when an input is a time series of images, convolution layer 802 may apply filter operations 812 to pixels of each input image, such as image 810. Filter operations 812 may be implemented as convolution of a filter over an entire image.

Results of filter operations 812 may be summed together to provide an output, such as feature maps 814, from convolution layer 802 to pooling layer 804. Other operations may also be performed, such as a Rectified Linear Unit operation, for example. Pooling layers combine the outputs of selected features or neuron clusters in one layer into a single neuron in the next layer. In some implementations, the output of a neuron cluster may be the maximum value from the cluster. In another implementation, the output of a neuron cluster may be the average value from the cluster. In yet another implementation, the output of a neuron cluster may be the sum from the cluster. For example, pooling layer 804 may perform subsampling operations 816 (e.g., maximum value, average, or sum) to reduce feature map 814 to a stack of reduced feature maps 818.

This output of pooling layer 804 may be fed to the fully-connected layer 806 to perform pattern detections. Fully connected layers connect every neuron in one layer to every neuron in another layer. The fully connected layers use the features from the other layers to classify an input image based on the training dataset. Fully-connected layer 806 may apply a set of weights in its inputs and accumulate a result as an output 808. For example, embodiments herein could result in output predictions (e.g., a probability) of whether an image is benign or malicious.

In practice, convolution and pooling layers may be applied to input data multiple times prior to the results being transmitted to the fully-connected layer. Thereafter, the final output value is tested to determine whether a pattern has been recognized or not. Each of the convolution, pooling, and fully-connected neural network layers may be implemented with regular multiply-and-then-accumulate operations. Algorithms implemented on standard processors such as CPU or GPU may include integer (or fixed-point) multiplication and addition, or float-point fused multiply-add (FMA). These operations involve multiplication operations of inputs with parameters and then summation of the multiplication results.

In at least one embodiment, machine learning module 162 may include one or more algorithms to facilitate deep transfer learning in a CNN to train a DNN behavior model, such as behavior model 170. In at least one embodiment, behavior model 170 is generated for a particular application, and other behavior models can be generated for other applications. Transfer learning involves borrowing the knowledge from a different domain to apply to a target domain. In one or more embodiments, the low-level model is a vision classification problem. The target domain is threat detection and security, and computing vision may be the other domain from which knowledge is borrowed for training the behavior model. Accordingly, the knowledge learned from other large visual datasets, such as ImageNet (e.g., more than a million images and a thousand categories) is transferred to a threat detection and security behavior model. In one embodiment, a CNN pre-trained on an ImageNet dataset may be used. A training dataset, which includes the time series of images and labels for each of the images, can be the input to a pre-trained CNN to train the behavior model.

Due to the use of a transfer learning scheme, the segmentation size m may be set to 224. In at least one embodiment, the system has flexibility to use any suitable CNN for the transfer learning scheme including, but not necessarily limited to Visual Geometry Group (VGG) or Inception that is pre-trained on an Image Net dataset. Note that when using Inception-v3, the system may automatically pad the execution trace images to 299×299. For instance, in some implementations, the system may select Inception-bn due to its fast computational architecture and high performance on ImageNet. The first portion of the network may then be frozen and the system may retrain the fully connected layers on the execution trace images. Retraining may be performed on the layers after the last pooling layer. In addition, augmenting the channels of original gray-scale images by replicating the gray-scale channel into RBG channels results in each behavior segmented image having a size that is compatible to the pre-trained neural networks. Because of the transfer learning scheme, faster model convergence is possible with the model being able to converge within 10 epochs in one example.

Validation may be performed on the trained behavior model. In one example 80% of the available data may be used for training and 20% of the available data for testing. The behavior model may be validated by using out-of-sample data, which was collected subsequent to collection of the data used for training the model. Through validation, as further detailed below, the higher accuracy and lower false positive rate of the behavior model of the present disclosure is demonstrated compared with classical machine learning algorithms.

After training and validating the behavior model, the system can perform runtime classification. In at least one embodiment, runtime classification can be performed by image classifier 164 and trained behavior model 170 during detection flow 320 shown in FIG. 3. Given an execution trace, the system processes the trace into a time series of images (e.g., 155B) of size 224×224 or 299×299. Then the behavior model 170 can produce a scoring on the time series of images. In at least one embodiment, the final decision on whether the execution trace is a benign or malicious trace can be based on ensemble voting. Instead of a simple majority vote, one implementation of the system provides a more robust ensemble voting scheme in order to reduce false positive rate.

As previously mentioned herein, the challenge to train an effective behavior model can occur if noise is present in the training dataset. Anomalous traces are not always malicious and the malicious behavior should be labeled only when an attack occurs. Hence, inherent from the training labels, in certain scenarios, some benign behaviors could be mistakenly labeled as malicious behaviors, and such mistakes are considered as the ground truth during training. This could potentially lead to bias in the testing and detection phases and to an artificially higher false positive rate.

To further address the noisy ground truth issue, one example system may introduce a convex combination parameter a into the behavior model in order to reduce the false positive rate. Parameter a can represent a threshold percentage that is used to determine whether a given execution trace is malicious or benign. In one example, a=0.75 (or 75%) as a default threshold for determining whether the percentage of images in a given execution trace that are voted as malicious indicate the execution trace is malicious. That is, if 75% or more images are voted as malicious then the execution trace is classified as malicious. Otherwise, the execution trace is classified as benign. In at least one embodiment, a vote can be a score assigned to an image that indicates the image is either malicious or benign. It should be noted that parameter a can be adjusted as needed, for example by a user, based on particular implementations and/or needs. Because the problem of noisy ground truth can occur frequently in malware detection, in some example implementations, two defense mechanisms (e.g., parameter t applied during testing flows and parameter a applied during detection flows) may be provided in the system to address this issue.

In some embodiments, additional scenarios may be accommodated by the system when determining whether to classify the execution trace as benign or malicious. For example, if a classification cannot be determined (e.g., if a threshold percentage of images cannot be classified), then the trace could be re-segmented into a smaller number of images and classification can be attempted again. In one example, if classification of N images cannot be determined, then N can be halved and classification can be attempted again on the newly generated N/2 images.

Another scenario that may be accommodated by the system is when the percentage of malicious images or the percentage of benign images is not within the threshold for the classifier to make a decision. For example, if the percentage of malicious images in an execution trace falls within a range that is not high enough to be definitively classified as malicious but not low enough to be definitively classified as benign, then the classifier may not be able to classify the execution trace. In at least one embodiment, in this scenario, user feedback as to how the execution trace should be classified may be requested and received. This user feedback can be incorporated into image classifier 164. Thus, subsequent similar execution traces may be classified based, at least in part, on the user feedback.

In another embodiment for performing runtime classification, probabilities can be assigned to each image in a time series of images and used as a basis for determining whether the corresponding execution trace is malicious. For example, an incoming trace X has predicted probabilities $\{p_1, p_2, \ldots, p_n\}$, where each probability is produced by the low-level behavior model 170 on one of the segments of the time series of images 155B. The top model (e.g., image classifier 164) then aggregates the sequence of probabilities by calculating the average. Hence, the probability of whether a process is under attack is given by $P\{X \in Y\} = \{P_1, P_2, \ldots, P_N\}$. In this embodiment, parameter p can represent a threshold percentage that is used to determine whether a given execution trace is malicious or benign based on the average of the sequence of probabilities assigned to the time series of images. In one example, p=0.75 (or 75%) as a default threshold for determining whether the average of probabilities of the images representing a given execution trace indicate the execution trace itself as malicious. That is, if the average of probabilities is 75% or more, then the execution trace may be classified as malicious. Otherwise, the execution trace may be classified as benign. It should be noted that parameter p can be adjusted as needed, for example by a user, based on particular implementations and/or needs.

Figure 9:
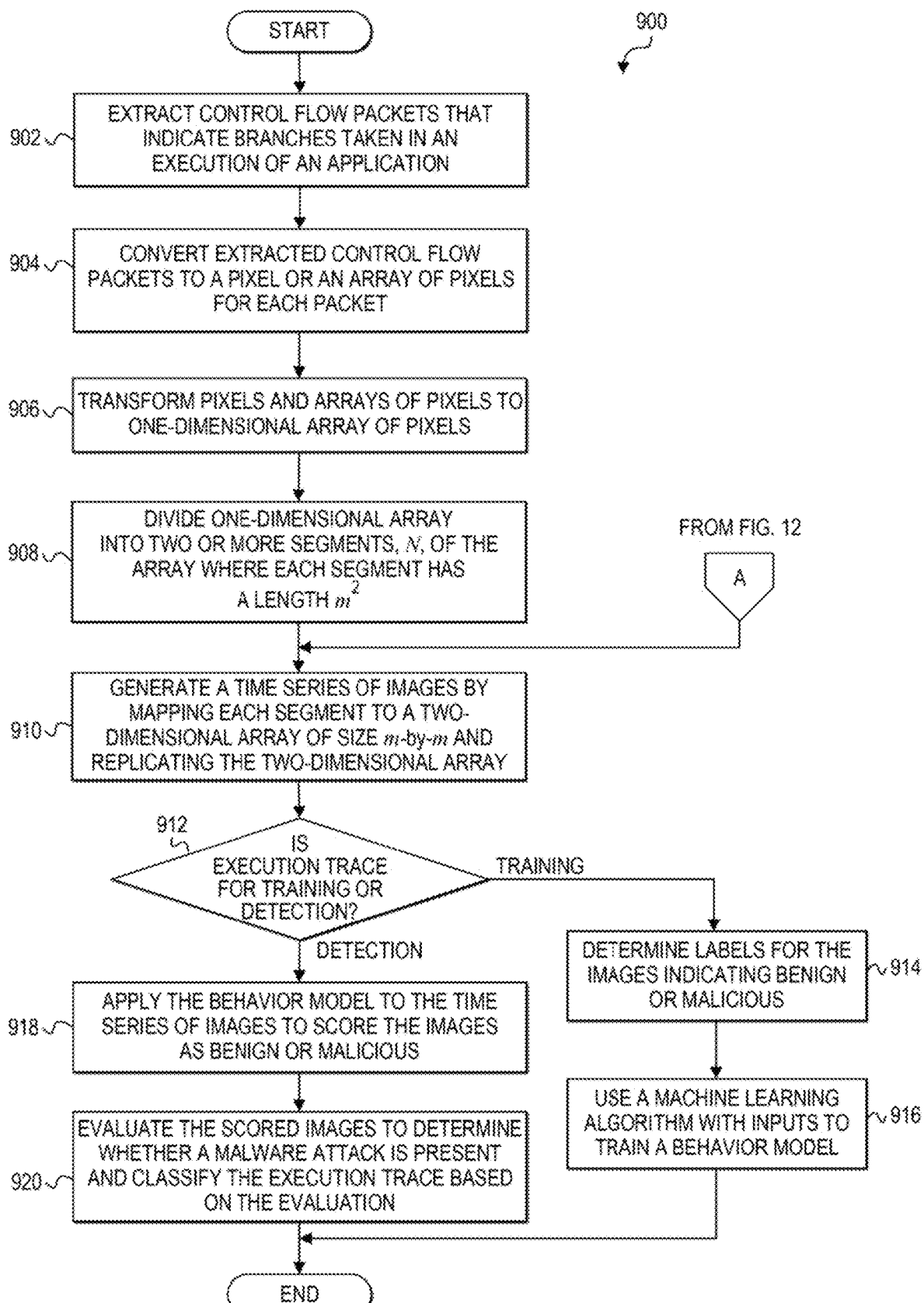
FIG. 9 is a simplified flow chart illustrating example operations associated with a deep learning and malware detection system according to at least one embodiment.

Turning to FIG. 9, FIG. 9 is a simplified flowchart that illustrates a high level of a possible flow 900 of operations associated with a deep learning and malware detection system in accordance with embodiments herein. In at least one embodiment, a set of operations corresponds to activities of FIG. 9. Trace decoder 140, image conversion module 150, and DNN classifier 160, or portions thereof, may utilize at least a portion of the set of operations. Deep learning and malware detection system 100 may comprise means such as processor 110, for performing the operations. In an embodiment, one or more operations of flow 900 may be performed by trace decoder 140, image conversion module 150, and DNN classifier module 160.

Initially, an application is executed on processor 110 and execution trace hardware 112 is running to generate trace data packets 115 corresponding to the execution of the application. The trace data packets are provided to trace collector driver 120. A sequence of trace data packets, referred to as execution trace 125, is provided to a user space application, trace collector 130. Trace collector 130 provides execution trace 125 to trace decoder 140.

At 902, control flow data packets that indicate branches taken during the execution of the application, such as indirect branches or conditional branches, are extracted from the execution trace of the application.

At 904, the extracted control flow packets are converted to pixels. A 1-byte packet is converted to a single pixel, whereas a packet with a multi-byte payload or a compressed target IP address is converted to an array of pixels. At 906, the pixels and arrays of pixels are transformed into a one-dimensional array of pixels. This transformed trace may be denoted by X having a length L.

At 908, the one-dimensional array is divided into two or more segments, N, where $N=L/m^2$, L is the length of sequence X, and each segment has a length $m^2$. At 910, the trace is transformed into a time series of images by mapping each segment into a two-dimensional array (or image) of m×m and replicating each m×m image to a produce 3-channel image. Each 3-channel image corresponds to one segment and is denoted by $I_k$ with $k \in \{1, 2, \ldots N\}$, such that $X=\{I_1, I_2, \ldots I_N\}$, where $\{I_1, I_2, \ldots I_N\}$ represents the time series of images.

At 912, a determination may be made as to whether the execution trace is for training (known execution) or for malware detection (unknown execution). If the execution trace is for training, then at 914, labels indicating whether an image is benign or malicious can be determined for (and assigned to) each of the images in the time series of images. This labeling process is further detailed herein with reference to FIG. 11.

At 916, a machine learning algorithm with inputs can be used to train a behavior model as previously described herein. The inputs can include the time series of images and the labels associated with the images. The resulting trained behavior model can detect an exploit in an unknown execution based on an anomaly in the execution. The trained behavior model can detect the exploit based on the input of a time series of images representing an execution trace of the unknown execution.

At 912, if the execution trace is unknown and being evaluated for possible malware detection, then at 918, the behavior model can be applied to the time series of images to score each image. In some implementations, the images may be scored as benign or malicious. In other implementations, a probability may be assigned to each image indicating the probability or likelihood that the image is malicious.

At 920, the scored images can be evaluated to determine whether a malware attack is present in the execution, and the execution trace and/or the application can be appropriately classified as benign or malicious based on the evaluation. If a malware attack is determined to be present, one or more actions (e.g., send an alert to a user, terminate execution of the application, etc.) may be taken. The processes of 918 and 920 are previously described herein and are further described with reference to FIGS. 12 and 13.

Figure 10:
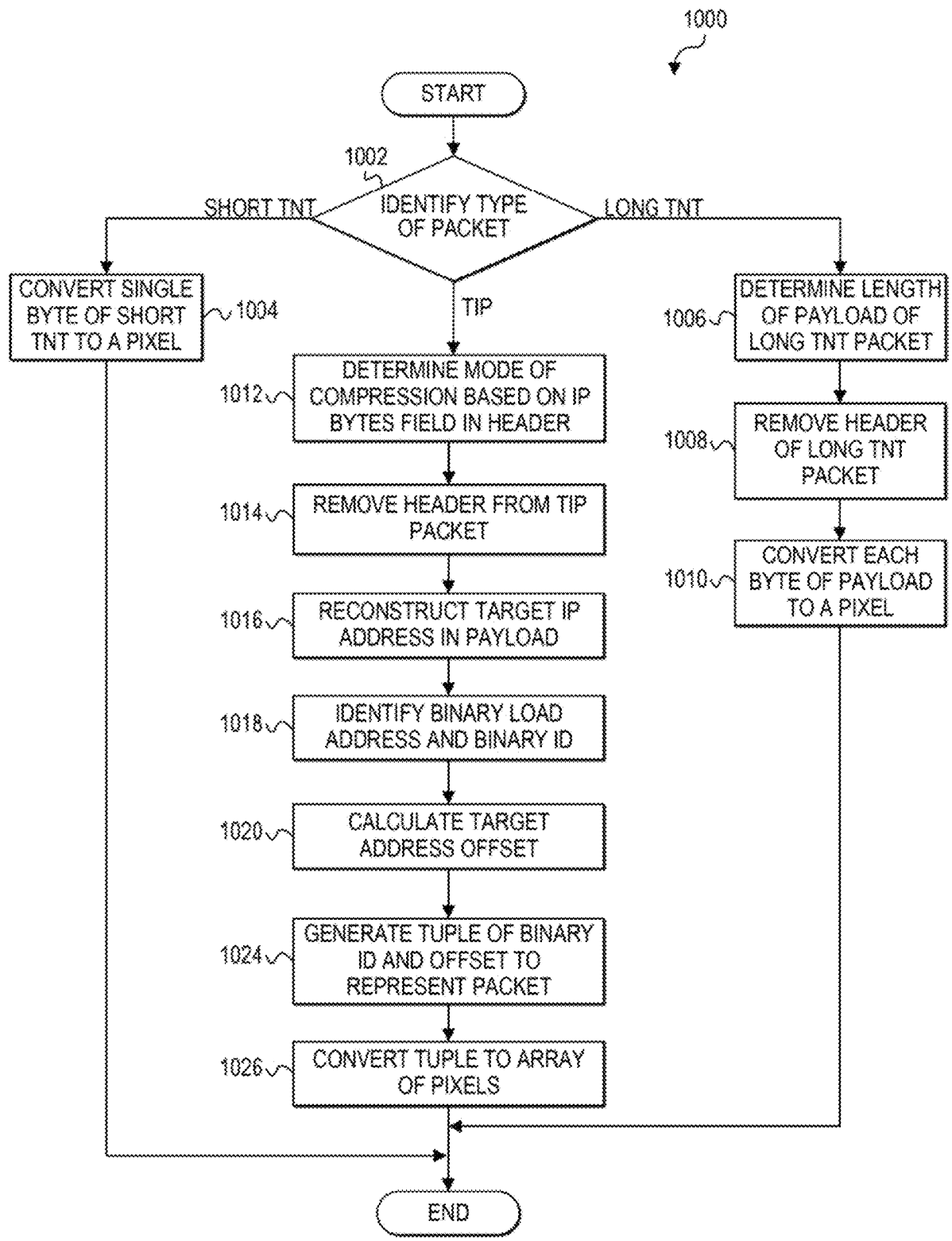
FIG. 10 is a simplified flow chart illustrating example operations associated with a deep learning and malware detection system according to at least one embodiment.

Turning to FIG. 10, FIG. 10 is a simplified flowchart that illustrates a possible flow 1000 of operations associated with a deep learning and malware detection system in accordance with embodiments herein. In at least one embodiment, a set of operations corresponds to activities of FIG. 10. Image conversion module 150 may utilize at least a portion of the set of operations. Deep learning and malware detection system 100 may comprise means such as processor 110, for performing the operations. In at least one embodiment, flow 1000 provides one possible implementation for converting extracted control flow packets and portions of extracted control flow packets to pixels as indicated at 904 in FIG. 9. Flow 1000 can be performed for each control flow packet received by image conversion module 150.

At 1002, a type of the control flow packet received by image conversion module 150 is identified. The control flow packet may be determined to be a short TNT packet, which contains 1 to 6 TNT bits, a header bit, and a trailing bit. If the control flow packet is determined to be a short TNT packet, then at 1004, the packet can be converted to a pixel having a value of 0 to 255.

If the control flow packet is determined to be long TNT packet, which contains a 1-byte to 6-byte payload and a 2-byte header, then at 1006, the length (e.g., number of bytes) in the payload is determined. In at least one example, the length of the payload is determined by examining the header. At 1008, the header can be removed. At 1010, the payload bytes can be converted to a pixel or to an array of pixels, depending on how many bytes are in the payload. For example, if the long TNT packet only contains one byte in the payload, then the identified one byte can be converted to a single pixel. If, however, the long TNT packet contains two or more bytes in the payload, then each byte in the payload can be converted to a pixel and thus, an array of pixels can be generated if the payload contains more than one byte. Each pixel can have a value of 0 to 255.

If the control flow packet is determined to be a TIP packet, which contains a 1-byte header and 0-8 bytes in the payload depending on the mode of compression, then at 1012, the mode of compression used on addresses in the payload is determined. The mode of compression indicates how the target address (TargetIP) payload is compressed and this mode can be identified from the most significant three bits in the header.

At 1014, the header of the TIP packet can be removed.

At 1016, using the last IP and the IP payload, the target address of the indirect branch can be reconstructed.

The target address is then normalized to accommodate load address randomization by operating system techniques such as ASLR. At 1018, the binary load address and a binary identifier of the executing application are identified. At 1020, a target address offset is calculated based on the binary load address and the target address.

At 1024, a tuple that includes the binary ID and the target address offset is generated. In one example, the binary ID is one byte and the offset is four bytes. Accordingly, at 1026, the tuple is converted to an array of five pixels. Each pixel can have a value of 0 to 255.

Figure 11:
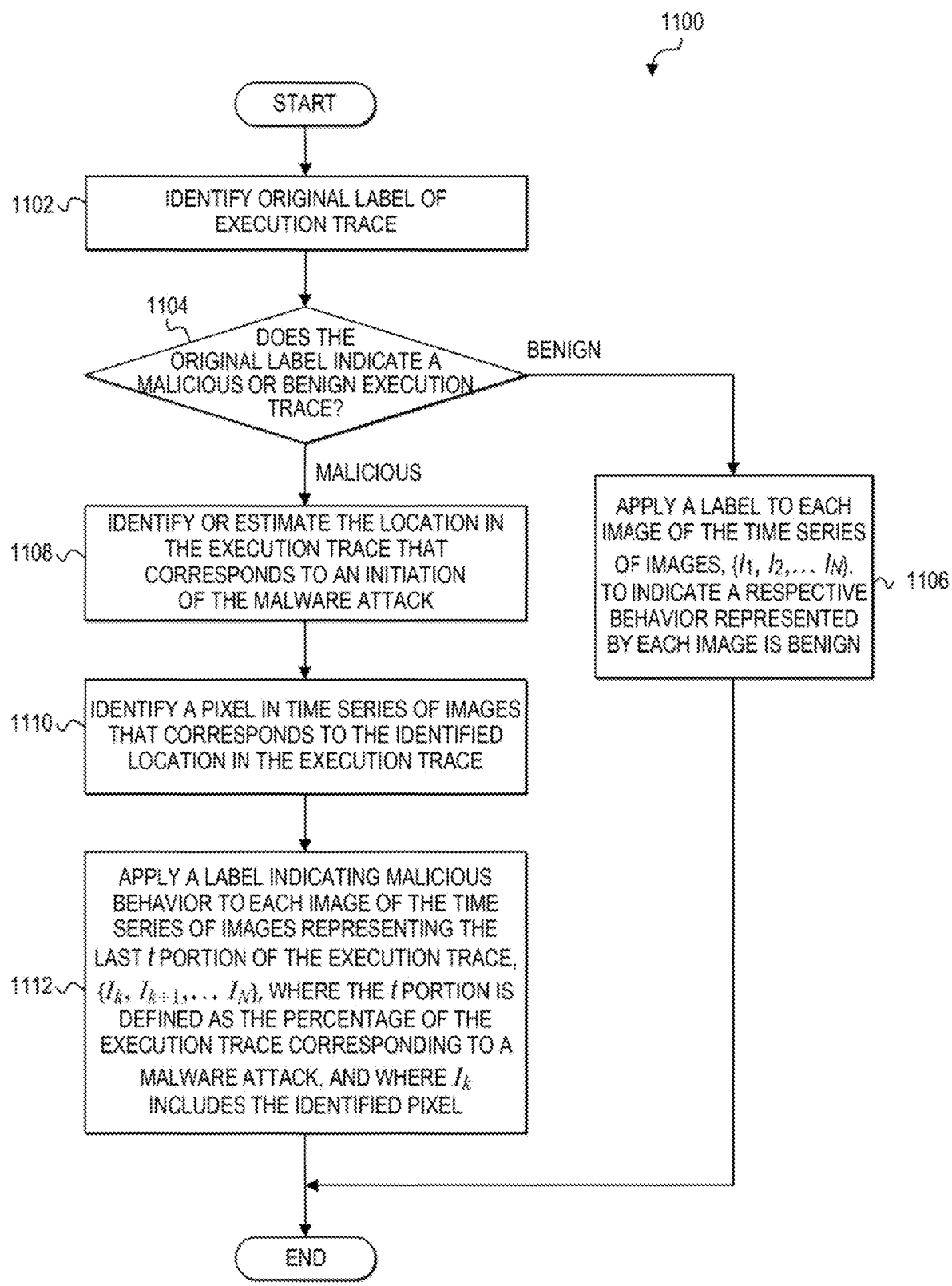
FIG. 11 is a simplified flow chart illustrating example operations associated with a deep learning and malware detection system according to at least one embodiment.

Turning to FIG. 11, FIG. 11 is a simplified flowchart that illustrates a high level of a possible flow 1100 of operations associated with a deep learning and malware detection system in accordance with embodiments herein. In at least one embodiment, a set of operations corresponds to activities of FIG. 11. DNN classifier module 160, or portions thereof such as machine learning module 162, may utilize at least a portion of the set of operations. Deep learning and malware detection system 100 may comprise means such as processor 110, for performing the operations. In at least one embodiment, flow 1100 provides one possible implementation for labeling training data input for a machine learning algorithm as indicated at 914 in FIG. 9. Flow 1100 is performed based on execution traces that have an original or known classification (e.g., benign or malicious) and therefore, are considered known execution traces. Flow 1100 may be invoked when a time series of images $\{I_1, I_2, \ldots I_N\}$ generated from a known execution trace (or portion of a known execution trace) has been received by DNN classifier module 160.

At 1102, an original label of the execution trace (or portion of the execution trace represented by the time series of images is identified. In at least one embodiment, the original label can indicate the execution trace is benign or malicious.

At 1104, a determination is made as to whether the original label indicates the execution trace is malicious or benign. If the original label indicates the execution trace is benign, then at 1106, a label can be applied to each image of the time series of images $\{I_1, I_2, \ldots I_n\}$ to indicate that behaviors represented by the images are benign.

At 1104, if the original label indicates that the execution trace is malicious, then at 1108, the location in the execution trace where a malware attack was initiated is identified. In other scenarios, if the location where the attack began cannot be precisely identified, the location in the execution trace where the attack began may be estimated.

At 1110, a pixel in the time series of images that corresponds to the identified location in the execution trace is identified. A parameter t is the percentage of the execution trace defined by the identified (or estimated) location in the execution trace to the end of the execution trace. Thus, parameter t is a percentage of the execution trace that corresponds to the malware attack. This portion of the execution trace may include packets generated when the attack was initiated and packets generated subsequent to the initiation of the attack.

At 1112, a label can be applied to each image of the time series of images representing the last t portion of the execution trace. For example, in a time series of images $\{I_1, I_2, \ldots I_N\}$, where $I_k$ is the image containing the identified pixel, the images to which a malicious label is applied can be represented as $\{I_k, I_{k+1}, \ldots I_N\}$. The label indicates that the behaviors represented by the images associated with the labels are malicious.

Figure 12:
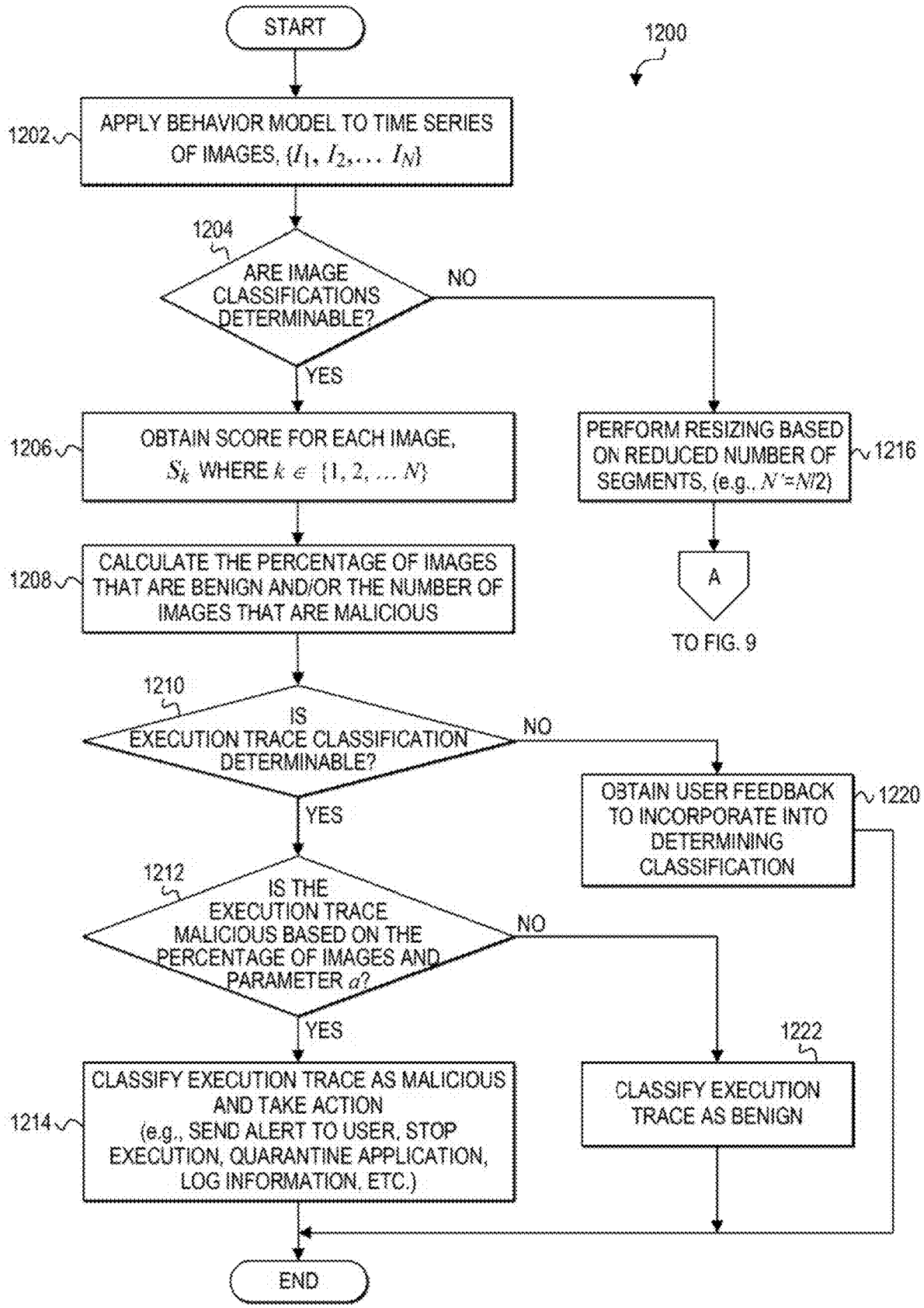
FIG. 12 is a simplified flow chart illustrating example operations associated with a deep learning and malware detection system according to at least one embodiment.

FIG. 12 is a simplified flowchart that illustrates a possible flow 1200 of operations associated with a deep learning and malware detection system in accordance with embodiments herein. In at least one embodiment, a set of operations corresponds to activities of FIG. 12. Behavior model 170 and DNN classifier module 160, or portions thereof such as image classifier 164, may utilize at least a portion of the set of operations. Deep learning and malware detection system 100 may comprise means such as processor 110, for performing the operations. In at least one embodiment, flow 1200 provides one possible implementation for performing a classification to detect a malware attack as indicated at 918-920 in FIG. 9. Flow 1200 is performed based on execution traces that do not have an original or known classification, and therefore, are considered unknown execution traces. Flow 1200 may begin when a time series of images $\{I_1, I_2, \ldots I_N\}$ generated from an unknown execution trace (or portion of an unknown execution trace) has been received by DNN classifier module 160.

At 1202, a trained behavior model can be applied to the unknown time series of images $\{I_1, I_2, \ldots I_N\}$.

At 1204, a determination is made as to whether classifications of the time series of images by the trained behavior model are determinable. For example, if classifications of the images cannot be made based on the trained behavior model or if classifications are made, but do not appear to be accurate, then classifications of the images may not be determinable and consequently, scores may not be assigned to the images. In this scenario, at 1216, resizing may be performed based on a reduced number of segments. For example, if the time series of images includes 100 images (i.e., N=100), then the execution trace could be re-segmented and resized images could be generated based on a reduced value of N, such as ½ of N. For example, the one-dimensional array of the execution trace (e.g., generated at 906 of FIG. 9) can be divided into N' arrays, or/segments, where N'=N/2. Thus, in each iteration, the granularity is reduced and the model is trained on fewer samples.

Once the new segments are generated, flow may pass back to 910 of FIG. 9, where each of the N' segments are mapped to a two-dimensional array. Accordingly, in this example, a resized time series of 50 images is generated, which reduces the granularity on the same execution trace. In at least one example, the images can be resized to 224×224 or 299×299.

With reference again to 1204, if the time series of image can be classified based on the trained behavior model, then at 1206, a score may be assigned to each segment (or image) of the N segments. Scores can be represented by $S_k$ where $k \in \{1, 2, \ldots N\}$, and each score (or vote) can indicate whether a respective image of the time series of images is benign or malicious.

At 1208, the percentage of images that are benign or malicious may be calculated. In some implementations, the percentage of malicious images is calculated. For example, if 80 images out of 100 images have a score indicating they are malicious, then the percentage of malicious images is 80% or 0.8. In some implementations, the percentage of benign images is calculated. For example, if 70 images out of 100 images have a score indicating they are benign, then the percentage of benign images is 70% or 0.7.

At 1210, a determination is made as to whether classification of the execution trace is determinable. This scenario may arise, for example, if the percentage of malicious images from an execution trace falls within a range that is not high enough to classify the execution trace as malicious but not low enough to be certain that the execution trace is benign. In at least some implementations, in this scenario the classifier may not be able to classify the execution trace. If classification of the execution trace is not determinable based on the percentage of benign images and/or the percentage of malicious images, then at 1220, user feedback may be obtained to assist with the classification when similar execution traces are subsequently evaluated.

If classification of the execution trace is determinable based on the percentage of benign images and/or the percentage of malicious images, then at 1212, a determination is made as to whether the execution trace is malicious based on a parameter a. Parameter a can represent a threshold percentage that is used to determine whether a given execution trace is malicious or benign based on the percentage of malicious or benign images identified in the trace by the behavior model. In one example, a=0.75 (or 75%) as a default threshold for determining whether the percentage of images in a given execution trace that are classified as malicious indicate the execution trace is malicious. That is, in this example, if 75% or more images are scored (or voted) as malicious then the execution trace is classified as malicious. Otherwise, the execution trace is classified as benign.

In another implementation, parameter a=0.50 (or 50%) as a default threshold for determining whether the percentage of images in a given execution trace that are classified as benign indicate the execution trace is benign. That is, in this example, if 50% or more images are scored (or voted) as benign then the execution trace is classified as benign.

At 1212, if a determination is made that the trace is benign based on parameter a and the percentage of images scored as malicious and/or the percentage of images scored as benign, then at 1222, the execution trace is classified as benign.

At 1212, if a determination is made that the trace is malicious based on parameter a and the percentage of images scored as malicious and/or the percentage of images scored as benign, then at 1214, the execution trace is classified as malicious. In at least some embodiments, if an execution trace is classified as malicious, an action may be taken. The action can include, but is not necessarily limited to sending an alert to a user, stopping execution of the application, stopping execution of all applications, quarantining the application, logging the information, etc.

Figure 13:
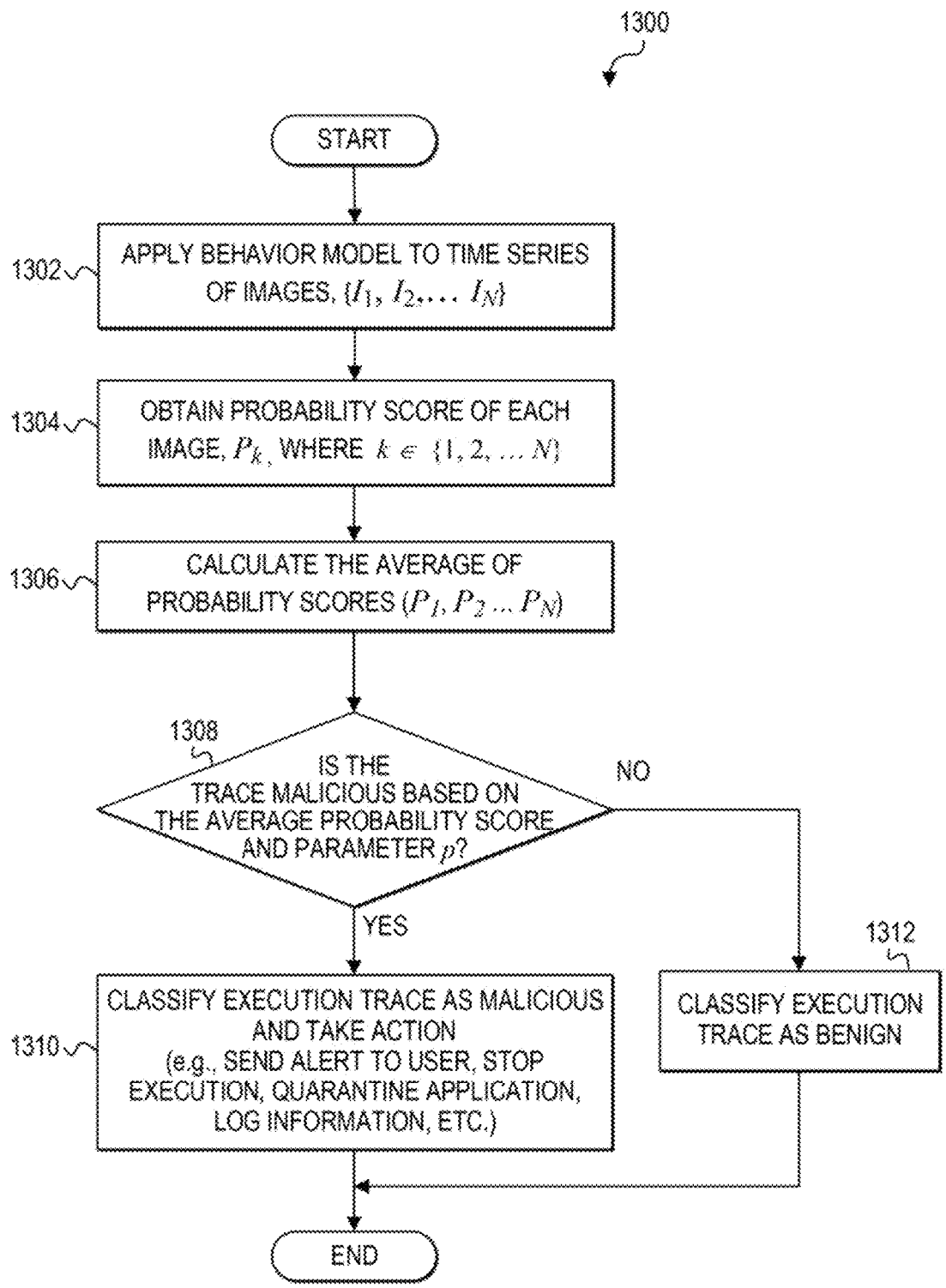
FIG. 13 is a simplified flow chart illustrating example operations associated with a deep learning and malware detection system according to at least one embodiment.

FIG. 13 is a simplified flowchart that illustrates a possible alternative flow 1300 of certain operations associated with a deep learning and malware detection system in accordance with embodiments herein. In at least one embodiment, a set of operations corresponds to activities of FIG. 13. Behavior model 170 and DNN classifier module 160, or portions thereof such as image classifier 164, may utilize at least a portion of the set of operations. Deep learning and malware detection system 100 may comprise means such as processor 110, for performing the operations. In at least one embodiment, flow 1300 provides an alternative embodiment for performing a classification to detect a malware attack as indicated at 918-920 in FIG. 9. Flow 1300 is performed based on execution traces that do not have an original or known classification, and therefore, are considered unknown execution traces. Flow 1300 may begin when a time series of images $\{I_1, I_2, \ldots I_N\}$ generated from an unknown execution trace (or portion of an unknown execution trace) has been received by DNN classifier module 160.

At 1302, a trained behavior model can be applied to the unknown time series of images $\{I_1, I_2, \ldots I_N\}$, and a probability that an image is benign or malicious may be assigned to each image.

At 1304, a probability may be obtained for each image of the time series of images. Probabilities can be represented by $P_k$ where $k \in \{1, 2, \ldots N\}$, and each probability value can indicate the probability of whether a respective image of the time series of images is benign or malicious.

At 1306, the average of the probabilities $\{P_1, P_2, \ldots, P_N\}$ assigned to the images can be calculated.

At 1308, a determination is made as to whether the execution trace is malicious based on the average probability and a parameter p. Parameter p can represent a threshold percentage that is used to determine whether a given execution trace is malicious or benign based on the average of the sequence of probabilities assigned to the time series of images. In one example, p=0.75 (or 75%) as a default threshold for determining whether the average of probabilities of the images representing a given execution trace indicate that the execution trace is malicious. That is, if the average of probabilities is 75% or more, then the execution trace may be classified as malicious. Otherwise, the execution trace may be classified as benign. It should be noted that parameter p can be adjusted as needed, for example by a user, based on particular implementations and/or needs.

At 1308, if a determination is made that the trace is benign based on parameter p and the average of the sequence of probabilities assigned to the images, then at 1312, the execution trace is classified as benign.

At 1308, if a determination is made that the trace is malicious based on parameter p and the average of the sequence of probabilities assigned to the images, then at 1310, the execution trace is classified as malicious. In at least some embodiments, if an execution trace is classified as malicious, an action may be taken. The action can include, but is not necessarily limited to sending an alert to a user, stopping execution of the application, stopping execution of all applications, quarantining the application, logging the information, etc.

It should also be noted that in the embodiment of flow 1300, alternative checks may also be included. For example, checks as to whether classifications of images are determinable (e.g., 1206) and/or checks as to whether an execution trace classification is determinable (e.g., 1210) may be incorporated in flow 1300 in a similar manner as incorporated in flow 1200.

Experimental Results

The image analysis-based DNN approach to detect ROP attacks may be validated against Adobe® Reader® software in a Windows® 7 operating system. For experiments, a sample set of 348 benign and 299 malicious pdf files is used, from which 348 benign and 299 malicious traces are collected. The finest-granularity behavior model may be trained in accordance with an embodiment described herein. TIP and TNT packets are extracted and memory addresses are converted into pixels having values of 0 to 255. Segmentation size m is set to 224 and each trace is segmented into a time series of gray-scale images of size 224×224. After segmentation, 55,666 benign behavioral images and 82,416 malicious images may be obtained, where 80% of the data is used for training and 20% for testing. Single channel images are converted into three channels by replicating the gray-scale image. Then, an Inception-transfer learning scheme may be used on the behavior images.

The experimental results show 0.9663 accuracy to classify malicious and benign behaviors and 0.0053 false positive. Out-of-sample malware detection is a hierarchical ensemble method, which currently achieves 100% at detecting malicious traces and 90% at detecting benign traces at a certain threshold parameter.

Figure 14:
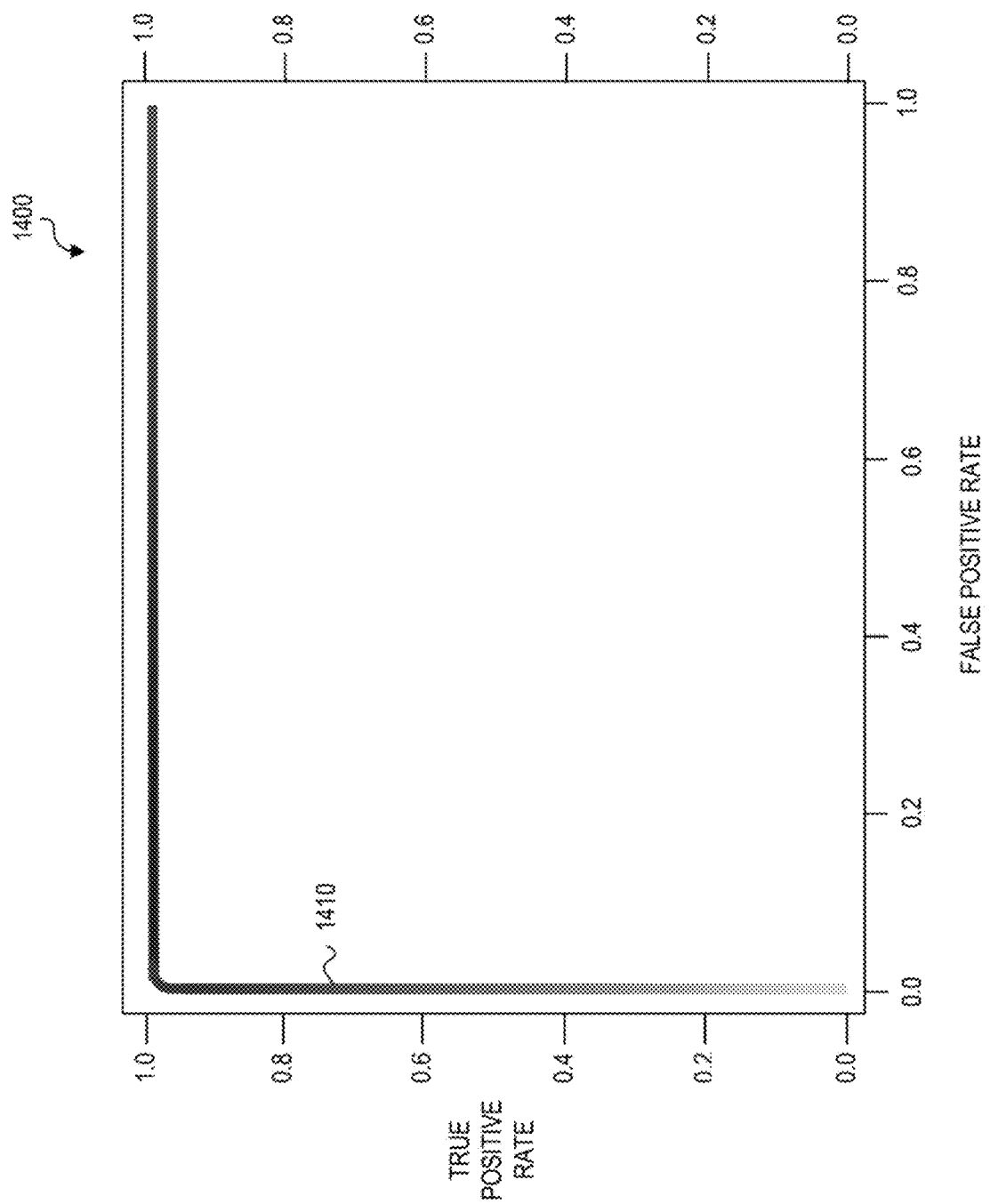
FIG. 14 is a graph illustrating a receiver operating characteristic (ROC) curve showing results indicating the effectiveness of an example behavior model generated by a deep learning and malware detection system according to at least one embodiment.

Turning to FIG. 14, FIG. 14 is a graph 1400, which shows a receiver operating characteristic (ROC) curve 1410 on test set of data. The area under ROC curve 1410 is a measure of how well a parameter can distinguish between a true positive rate of malware detection and a false positive rate of malware detection. From the testing results, the area under ROC curve 1410 is 0.996. This demonstrates that a desirable false positive rate may be obtained without sacrificing accuracy.

Additionally, this image analysis-based DNN approach to detect ROP attacks may be compared with classical machine learning algorithms. For K-nearest neighbor, K may be varied to examine the accuracy and false positive. For the algorithms in comparison, the example systems described above provide the best performance:

| Algorithm | Accuracy | False Positive |
|---|---|---|
| Deep inception transfer | 0.99 | 0.004 |
| K nearest neighbor with PCA | 0.8 | 0.05 |
| Random Forest with PCA | 0.63 | 0.02 |

The transfer learning scheme may be further compared with training from scratch. In this comparison, the training-from-scratch regime uses a 3-layer CNN with 2 convolutional layers and 1 fully connected layer and with the images resized to 28 by 28, hence a great amount of data loss. The purpose of this experiment is to provide a baseline for deep learning based algorithm, and also present the advantage of using transfer learning for execution trace-based threat analysis.

Further, deep learning training scheme may be compared with classical ML algorithm. It is found that deep learning has better performance than classical machine learning:

| Algorithm | Training | Accuracy | False Positive | Information Loss |
|---|---|---|---|---|
| Inception-transfer (224 by 224) | Transfer training | 0.99 | 0.004 | No info loss |
| 2-layer CNN and resize to 28 by 28 | Training from scratch | 0.9 | 0.1 | Info loss due to resizing |
| KNN on 28 by 28 | K = 3, 5, . . . , 23 | 0.75 | 0.4 | Info loss due to resizing |
| Naïve bayes on 28 by 28 | | 0.82 | 0.23 | |

The example system described above may be used to conduct out of sample validation and run time detection. For out of sample detection, there are 31 benign traces and 29 malicious traces. In one prototype system, the out-of-sample detection is the hierarchical ensemble method, which achieves 100% at detecting malicious traces and 92% at detecting benign traces at a certain threshold parameter. While cross validating using parameter a, it is possible that the false positive rate may be even further reduced.

Figure 15:
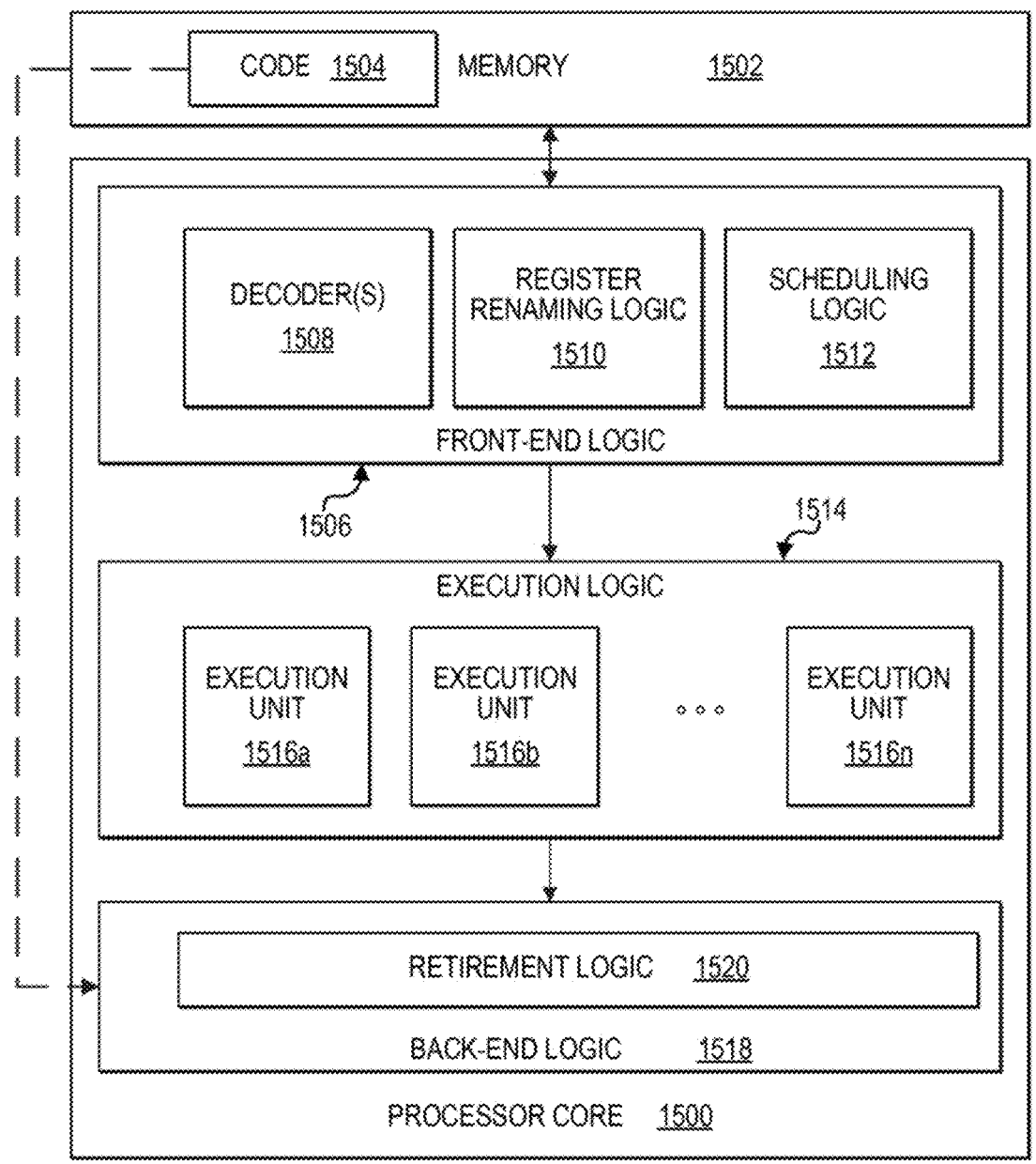
FIG. 15 is a block diagram illustrating an example processor core and memory according to at least one embodiment.
Figure 16:
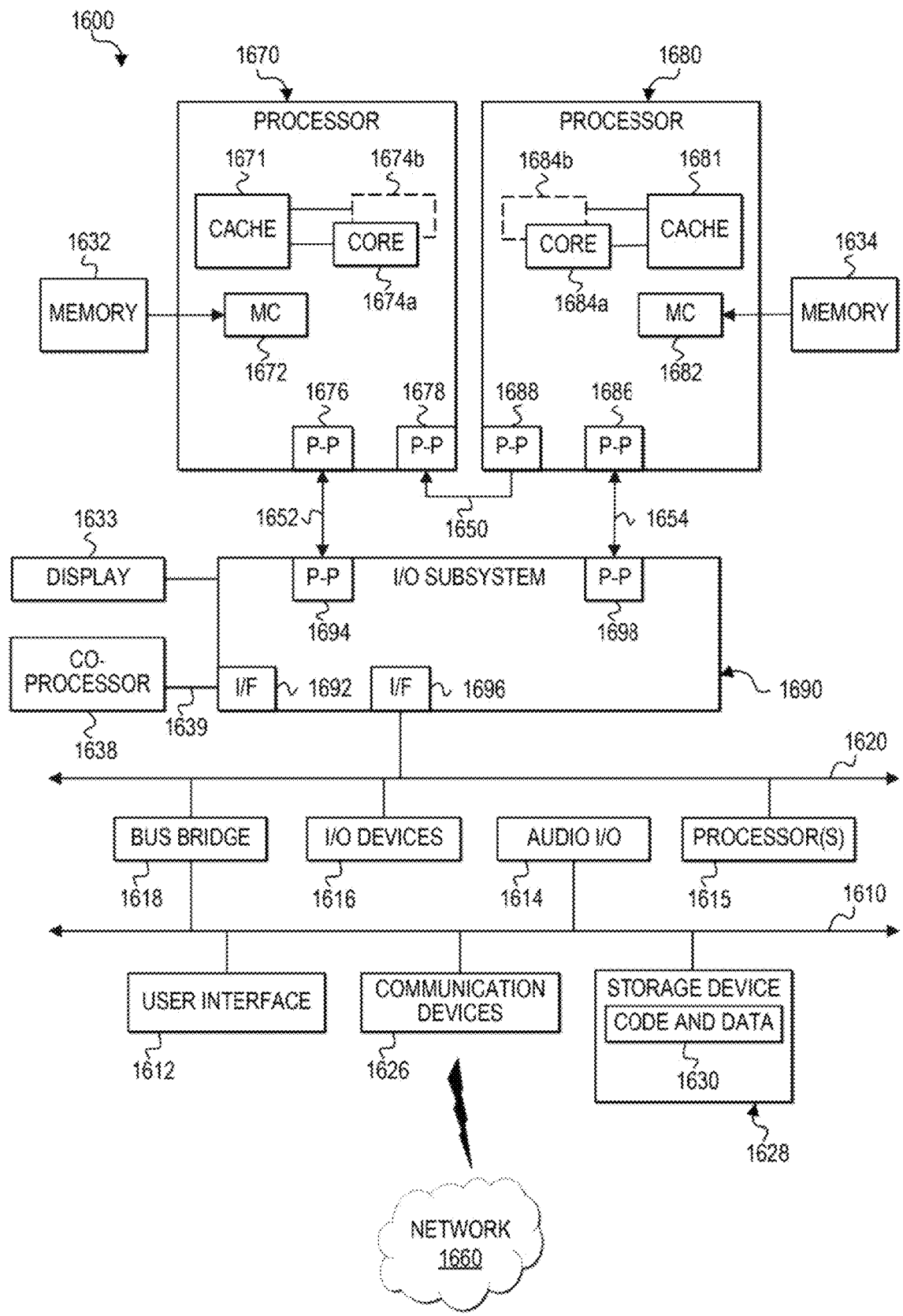
FIG. 16 is a block diagram of an example computer architecture according to at least one embodiment.
Figure 17:
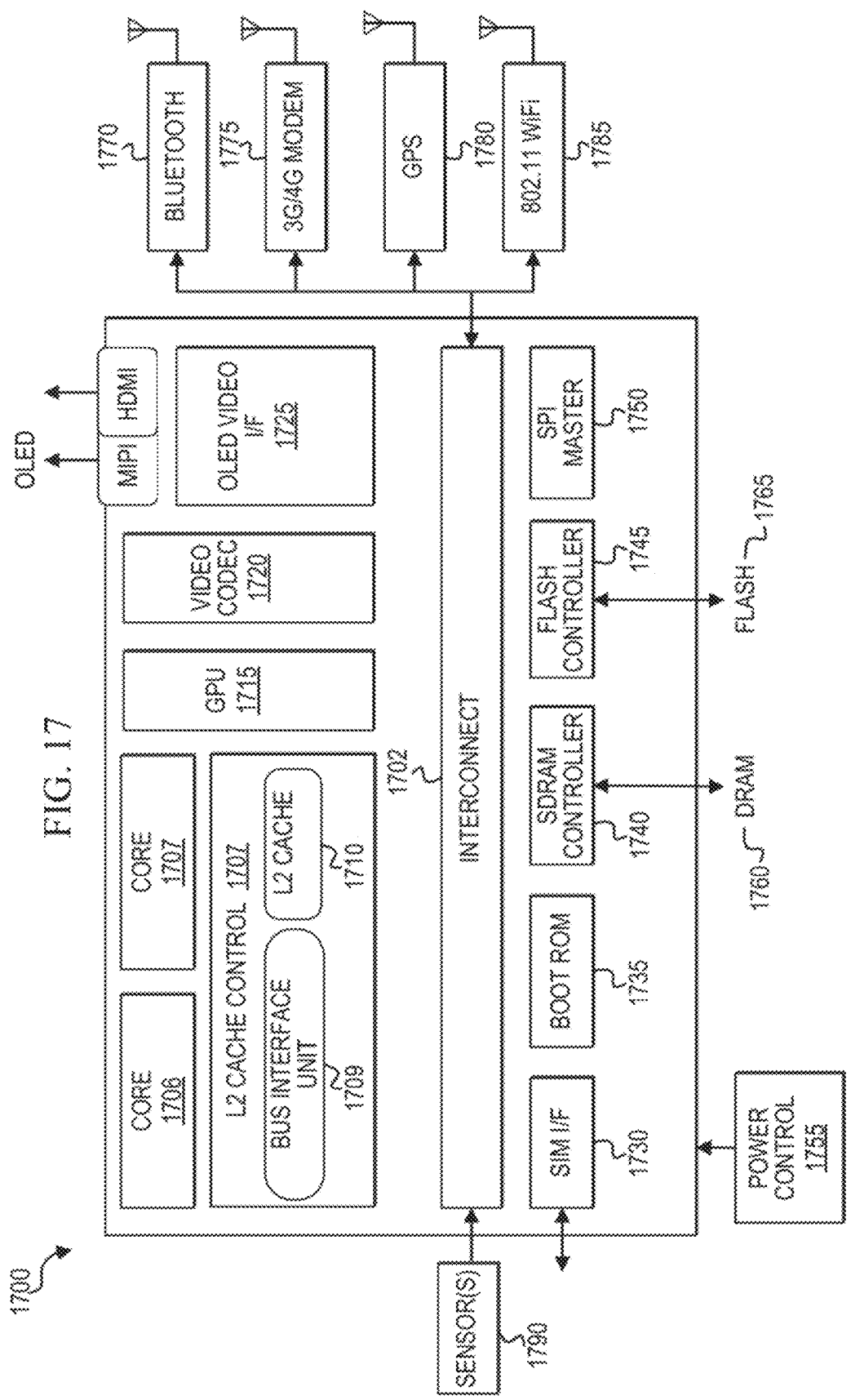
FIG. 17 is a block diagram of an example system-on-a-chip (SoC) computer architecture according to at least one embodiment.

Turning to FIGS. 15-17, FIGS. 15-17 are block diagrams of exemplary computer architectures that may be used in accordance with embodiments (e.g., deep learning and malware detection system 100) disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of deep learning and malware detection system 100 described herein. Generally, suitable computer architectures for embodiments disclosed herein can include, but are not limited to, configurations illustrated in FIGS. 15-17.

FIG. 15 is an example illustration of a processor according to an embodiment. Processor 1500 is an example of a type of hardware device that can be used in connection with the implementations above, including for example, processor 110. Processor 1500 may be any type of processor, such as a microprocessor, an embedded processor, a digital signal processor (DSP), a network processor, a multi-core processor, a single core processor, or other device to execute code. Although only one processor 1500 is illustrated in FIG. 15, a processing element may alternatively include more than one of processor 1500 illustrated in FIG. 15. Processor 1500 may be a single-threaded core or, for at least one embodiment, the processor 1500 may be multi-threaded in that it may include more than one hardware thread context (or "logical processor") per core.

FIG. 15 also illustrates a memory 1502 coupled to processor 1500 in accordance with an embodiment. Memory 1502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1500 can execute any type of instructions associated with algorithms, processes, or operations detailed herein. Generally, processor 1500 can transform an element or an article (e.g., data) from one state or thing to another state or thing.

Code 1504, which may be one or more instructions to be executed by processor 1500, may be stored in memory 1502, or may be stored in software, hardware, firmware, or any suitable combination thereof, or in any other internal or external component, device, element, or object where appropriate and based on particular needs. In one example, processor 1500 can follow a program sequence of instructions indicated by code 1504. Each instruction enters a front-end logic 1506 and is processed by one or more decoders 1508. The decoder may generate, as its output, a micro operation such as a fixed width micro operation in a predefined format, or may generate other instructions, microinstructions, or control signals that reflect the original code instruction. Front-end logic 1506 also includes register renaming logic 1510 and scheduling logic 1512, which generally allocate resources and queue the operation corresponding to the instruction for execution.

Processor 1500 can also include execution logic 1514 having a set of execution units 1516a, 1516b, 1516n, etc. Some embodiments may include a number of execution units dedicated to specific functions or sets of functions. Other embodiments may include only one execution unit or one execution unit that can perform a particular function. Execution logic 1514 performs the operations specified by code instructions.

After completion of execution of the operations specified by the code instructions, back-end logic 1518 can retire the instructions of code 1504. In one embodiment, processor 1500 allows out of order execution but requires in order retirement of instructions. Retirement logic 1520 may take a variety of known forms (e.g., re-order buffers or the like). In this manner, processor 1500 is transformed during execution of code 1504, at least in terms of the output generated by the decoder, hardware registers and tables utilized by register renaming logic 1510, and any registers (not shown) modified by execution logic 1514.

Although not shown in FIG. 15, a processing element may include other elements on a chip with processor 1500. For example, a processing element may include memory control logic along with processor 1500. The processing element may include I/O control logic and/or may include I/O control logic integrated with memory control logic. The processing element may also include one or more caches. In some embodiments, non-volatile memory (such as flash memory or fuses) may also be included on the chip with processor 1500.

FIG. 16 illustrates a computing system 1600 that is arranged in a point-to-point (PtP) configuration according to an embodiment. In particular, FIG. 16 shows a system where processors, memory, and input/output devices are interconnected by a number of point-to-point interfaces. Generally, one or more of the computing systems or computing devices described (e.g., deep learning and malware detection system 100) herein may be configured in the same or similar manner as computing system 1600.

Processors 1670 and 1680 may be implemented as single core processors 1674a and 1684a or multi-core processors 1674a-1674b and 1684a-1684b. Processors 1670 and 1680 may each include a cache 1671 and 1681 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 1670 and 1680 may also each include integrated memory controller logic (MC) 1672 and 1682 to communicate with memory elements 1632 and 1634, which may be portions of main memory locally attached to the respective processors. In alternative embodiments, memory controller logic 1672 and 1682 may be discrete logic separate from processors 1670 and 1680. Memory elements 1632 and/or 1634 may store various data to be used by processors 1670 and 1680 in achieving operations and functionality outlined herein.

Processors 1670 and 1680 may be any type of processor, such as those discussed in connection with other figures. Processors 1670 and 1680 may exchange data via a point-to-point (PtP) interface 1650 using point-to-point interface circuits 1678 and 1688, respectively. Processors 1670 and 1680 may each exchange data with an input/output (I/O) subsystem 1690 via individual point-to-point interfaces 1652 and 1654 using point-to-point interface circuits 1676, 1686, 1694, and 1698. I/O subsystem 1690 may also exchange data with a high-performance graphics circuit 1638 via a high-performance graphics interface 1639, using an interface circuit 1692, which could be a PtP interface circuit. In one embodiment, the high-performance graphics circuit 1638 is a special-purpose processor, such as, for example, a high-throughput MIC processor, a network or communication processor, compression engine, graphics processor, GPGPU, embedded processor, or the like. I/O subsystem 1690 may also communicate with a display 1633 for displaying data that is viewable by a human user. In alternative embodiments, any or all of the PtP links illustrated in FIG. 16 could be implemented as a multi-drop bus rather than a PtP link.

I/O subsystem 1690 may be in communication with a bus 1620 via an interface circuit 1696. Bus 1620 may have one or more devices that communicate over it, such as a bus bridge 1618 and I/O devices 1616. Via a bus 1610, bus bridge 1618 may be in communication with other devices such as a user interface 1612 (such as a keyboard, mouse, touchscreen, or other input devices), communication devices 1626 (such as modems, network interface devices, or other types of communication devices that may communicate through a computer network 1660), audio I/O devices 1614, and/or a data storage device 1628. Data storage device 1628 may store code and data 1630, which may be executed by processors 1670 and/or 1680. In alternative embodiments, any portions of the bus architectures could be implemented with one or more PtP links.

The computer system depicted in FIG. 16 is a schematic illustration of an embodiment of a computing system that may be utilized to implement various embodiments discussed herein. It will be appreciated that various components of the system depicted in FIG. 16 may be combined in a system-on-a-chip (SoC) architecture or in any other suitable configuration capable of achieving the functionality and features of examples and implementations provided herein.

Turning to FIG. 17, FIG. 17 is a simplified block diagram associated with an example Advanced RISC Machines (ARM) ecosystem system-on-chip (SOC) 1700 of the present disclosure. At least one example implementation of the present disclosure can include the deep learning and malware detection features discussed herein and an ARM component. For example, in at least some embodiments, system 100, shown and described herein, could be configured in the same or similar manner ARM ecosystem SOC 1700. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, wearable electronic device, any type of touch-enabled input device, etc.

In this example of FIG. 17, ARM ecosystem SOC 1700 may include multiple cores 1706-1707, an L2 cache control 1707, a bus interface unit 1709, an L2 cache 1710, a graphics processing unit (GPU) 1715, an interconnect 1702, a video codec 1720, and an organic light emitting diode (OLED) I/F 1725, which may be associated with mobile industry processor interface (MIPI)/high-definition multimedia interface (HDMI) links that couple to an OLED display.

ARM ecosystem SOC 1700 may also include a subscriber identity module (SIM) I/F 1730, a boot read-only memory (ROM) 1735, a synchronous dynamic random access memory (SDRAM) controller 1740, a flash controller 1745, a serial peripheral interface (SPI) master 1750, a suitable power control 1755, a dynamic RAM (DRAM) 1760, flash 1765, and one or more sensors 1790. In addition, one or more example embodiments include one or more communication capabilities, interfaces, and features such as instances of Bluetooth™ 1770, a 3G modem 1775, a global positioning system (GPS) 1780, and an 802.11 Wi-Fi 1785.

In operation, the example of FIG. 17 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

In an example implementation, deep learning and malware detection system 100 includes software to achieve (or to foster) the deep learning and malware detection, as outlined herein. In some embodiments, these techniques may be carried out by hardware and/or firmware, implemented externally to these elements, or included in some other computing system to achieve the intended functionality. These elements may also include software (or reciprocating software) that can coordinate with other network elements or computing systems in order to achieve the intended functionality, as outlined herein. In still other embodiments, one or several elements may include any suitable algorithms, hardware, software, components, modules, interfaces, or objects that facilitate the operations thereof. Modules may be suitably combined or partitioned in any appropriate manner, which may be based on particular configuration and/or provisioning needs.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. For example, a user feedback loop may be incorporated to request and obtain user feedback regarding classifications of images and/or execution traces (e.g., 1220). Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and Y, but not Z; 5) at least one X and Z, but not Y; 6) at least one Y and Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Other Notes and Examples

The following examples pertain to embodiments in accordance with this specification. Example A1 provides an apparatus, a system, one or more machine readable storage mediums, a method, and/or hardware-, firmware-, and/or software-based logic, where the Example of A1 includes converting a first data of a first control flow packet to a first pixel, wherein the first data indicates one or more branches taken during a known execution of an application; generating an array of pixels using the first pixel and one or more other pixels associated with one or more other control flow packets generated from the known execution; transforming the array of pixels into a series of images; and using a machine learning algorithm with inputs to train a behavior model to identify a malicious behavior in an unknown execution of the application, wherein the inputs include one or more images of the series of images and respective image labels assigned to the one or more images.

In Example A2, the subject matter of Example A1 can optionally include where the first data includes one or more bits each indicating whether a conditional branch was taken in the known execution.

In Example A3, the subject matter of Example A1 can optionally include where the first data includes a memory address in a payload of the first control flow packet, the memory address representing a target address of an indirect branch taken in the known execution.

In Example A4, the subject matter of any one of Examples A1-A3 can optionally include where the series of images is a sequence of three-channel images.

In Example A5, the subject matter of any one of Examples A1-A4 can optionally include dividing the array of pixels into two or more segments; mapping each segment to a two-dimensional array; and replicating each two-dimensional array to produce a three-channel image corresponding to a respective segment.

In Example A6, the subject matter of any one of Examples A1-A5 can optionally include extracting the first control flow packet from an execution trace representing at least a part of the known execution of the application.

In Example A7, the subject matter of any one of Examples A1-A6 can optionally include prior to using the machine learning algorithm to train the behavior model, assigning the respective image labels to the one or more images in the series of images.

In Example A8, the subject matter of any one of Examples A6-A7 can optionally include where based on a first label indicating that the execution trace is benign, each image label assigned to a corresponding image indicates that a behavior represented by the corresponding image is benign.

In Example A9, the subject matter of any one of Examples A1-A8 can optionally include where the one or more images include all of the images of the series of images.

In Example A10, the subject matter of any one of Examples A6-A7 can optionally include where based on a first label indicating that the execution trace is malicious, the respective image labels are assigned to the images to indicate that behaviors represented by the images are malicious.

In Example A11, the subject matter of any one of Examples A6-A7 or A10 can optionally include identifying a location in the execution trace corresponding to an initiation of a malware attack; identifying a pixel in an image of the series of images corresponding to the identified location in the execution trace; and selecting the image containing the pixel and each subsequent image representing the execution trace as the one or more images to which the respective image labels are to be assigned.

In Example A12, the subject matter of any one of Examples A1-A11 can optionally include where the machine learning algorithm is associated with a convolutional neural network (CNN), wherein the CNN is pre-trained on a dataset associated with a domain other than malware detection.

In Example A13, the subject matter of any one of Examples A1-A12 can optionally include generating a second series of images based on one or more other control flow packets of an unknown execution of the application; applying the behavior model to the second series of images to produce a respective score for each image of the second series of images; and determining whether a malware attack is present in the unknown execution based, at least in part, on the scores and a parameter.

Example B1 provides an apparatus, a system, one or more machine readable storage mediums, a method, and/or hardware-, firmware-, and/or software-based logic, where the Example of B1 includes converting a first data of a first control flow packet to a first pixel, wherein the first data indicates one or more branches taken during an unknown execution of an application; generating an array of pixels using the first pixel and one or more other pixels associated with one or more other control flow packets generated from the unknown execution; transforming the array of pixels into a series of images; and applying a behavior model generated by a machine learning algorithm to the series of images to produce a respective score for each image of the series of images; and determining whether a malware attack is present in the unknown execution based on the scores and a parameter.

In Example B2, the subject matter of Example B1 can optionally include where the first data includes one or more bits each indicating whether a conditional branch was taken in the unknown execution.

In Example B3, the subject matter of Example B1 can optionally include where the first data includes a memory address in a payload of the first control flow packet, the memory address representing a target address of an indirect branch taken in the unknown execution.

In Example B4, the subject matter of any one of Examples B1-B3 can optionally include where the series of images is a sequence of three-channel images.

In Example B5, the subject matter of any one of Examples B1-B4 can optionally include dividing the array of pixels into two or more segments, mapping each segment to a two-dimensional array, and replicating each two-dimensional array to produce a three-channel image corresponding to a respective segment.

In Example B6, the subject matter of Example B5 can optionally include where prior to dividing the array of pixels into the two or more segments, select a reduced number of segments in response to the behavior model being unable to classify a first series of images corresponding to a first number of segments, wherein the reduced number of segments corresponds to the two or more segments.

In Example B7, the subject matter of any one of Examples B1-B6 can optionally include where extracting the first control flow packet from an execution trace representing at least a part of the unknown execution of the application.

In Example B8, the subject matter of Example B7 can optionally include, based on determining that a malware attack is present in the unknown execution, classifying the execution trace as malicious and taking an action.

In Example B9, the subject matter of any one of Examples B7-B8 can optionally include calculating a percentage of images that are classified as malicious according to the scores assigned to the images and determining whether to classify the execution trace as malicious based on the calculated percentage of images and a threshold percentage of images represented by the parameter.

In Example B10, the subject matter of any one of Examples B7-B8 can optionally include based on the scores assigned to the images, calculating an average probability of a malware attack in the unknown execution, wherein each score assigned to a corresponding image is a probability that the corresponding image represents a malicious behavior in the unknown execution; and determining whether to classify the execution trace as malicious based on the average probability and a threshold probability represented by the parameter.

In Example B11, the subject matter of any one of Examples B1-B10 can optionally include where the behavior model is trained based, in part, on a convolutional neural network (CNN), wherein the CNN is pre-trained on a dataset associated with a domain other than malware detection.

An Example X1 provides an apparatus, the apparatus comprising means for performing the method of any one of the preceding examples.

In Example X2, the subject matter of Example X1 can optionally include that the means for performing the method comprises at least one processor and at least one memory element.

In Example X3, the subject matter of Example X2 can optionally include that the at least one memory element comprises machine readable instructions that when executed, cause the apparatus to perform the method of any one of the Examples A1-A13 or B1-B11.

In Example X4, the subject matter of any one of Examples X1-X3 can optionally include that the apparatus is one of a computing system or a system-on-a-chip.

Example Y1 provides at least one machine readable storage medium comprising instructions, where the instructions when executed realize an apparatus or implement a method in any one of the Examples A1-A13 or B1-B11.

What is claimed is:

1. At least one non-transitory machine readable medium comprising instructions for execution, wherein the instructions, when executed by at least one processor, cause the at least one processor to:
    convert a first data of a first control flow packet to a first pixel, wherein the first data indicates one or more branches taken during a known execution of an application;
    generate an array of pixels using the first pixel and one or more other pixels associated with one or more other control flow packets generated from the known execution;
    transform the array of pixels into a series of images; and
    use a machine learning algorithm with inputs to train a behavior model to identify a malicious behavior in an unknown execution of the application, wherein the inputs include one or more images of the series of images and respective image labels assigned to the one or more images.

2. The at least one non-transitory machine readable medium of claim 1, wherein the first data includes one or more bits each indicating whether a conditional branch was taken in the known execution.

3. The at least one non-transitory machine readable medium of claim 1, wherein the first data includes a memory address in a payload of the first control flow packet, the memory address representing a target address of an indirect branch taken in the known execution.

4. The at least one non-transitory machine readable medium of claim 1, wherein the series of images is a sequence of three-channel images.

5. The at least one non-transitory machine readable medium of claim 1, wherein the instructions, when executed by the at least one processor, cause the at least one processor to:
    divide the array of pixels into two or more segments;
    map each segment to a two-dimensional array; and
    replicate each two-dimensional array to produce a three-channel image corresponding to a respective segment.

6. The at least one non-transitory machine readable medium of claim 1, wherein the instructions when executed by the at least one processor cause the at least one processor to:
    extract the first control flow packet from an execution trace representing at least a part of the known execution of the application.

7. The at least one non-transitory machine readable medium of claim 6, wherein the instructions, when executed by the at least one processor, cause the at least one processor to:
    prior to using the machine learning algorithm to train the behavior model, assign the respective image labels to the one or more images in the series of images.

8. The at least one non-transitory machine readable medium of claim 6, wherein based on a first label indicating that the execution trace is benign, each image label assigned to a corresponding image indicates that a behavior represented by the corresponding image is benign.

9. The at least one non-transitory machine readable medium of claim 8, wherein the one or more images include all of the images of the series of images.

10. The at least one non-transitory machine readable medium of claim 6, wherein based on a first label indicating that the execution trace is malicious, the respective image labels are assigned to the images to indicate that behaviors represented by the images are malicious.

11. The at least one non-transitory machine readable medium of claim 6, wherein the instructions, when executed by the at least one processor, cause the at least one processor to:
identify a location in the execution trace corresponding to an initiation of a malware attack;
identify a pixel in an image of the series of images corresponding to the identified location in the execution trace; and
select the image containing the pixel and each subsequent image representing the execution trace as the one or more images to which the respective image labels are to be assigned.

12. The at least one non-transitory machine readable medium of claim 1, wherein the machine learning algorithm is associated with a convolutional neural network (CNN), wherein the CNN is pre-trained on a dataset associated with a domain other than malware detection.

13. The at least one non-transitory machine readable medium of claim 1, wherein the instructions, when executed by the at least one processor, cause the at least one processor to:
generate a second series of images based on one or more other control packets of an unknown execution of the application;
apply the behavior model to the second series of images to produce a respective score for each image of the second series of images; and
determine whether a malware attack is present in the unknown execution based, at least in part, on the scores and a parameter.

14. An apparatus, the apparatus comprising:
at least one processor coupled to a memory, the processor configured to execute program instructions stored in the memory to:
convert a first data of a first control flow packet to a first pixel, wherein the first data indicates one or more branches taken during a known execution of an application;
generate an array of pixels using the first pixel and one or more other pixels associated with one or more other control flow packets generated from the known execution;
transform the array of pixels into a series of images; and
use a machine learning algorithm with inputs to train a behavior model to identify a malicious behavior in an unknown execution of the application, wherein the inputs include one or more images of the series of images and respective image labels assigned to the one or more images.

15. The apparatus of claim 14, wherein the first data includes one or more bits each indicating whether a conditional branch was taken in the known execution.

16. The apparatus of claim 14, wherein the first data includes a memory address in a payload of the first control flow packet, the memory address representing a target address of an indirect branch taken in the known execution.

17. The apparatus of claim 14, wherein the processor is configured to execute program instructions stored in the memory to:
extract the first control flow packet from an execution trace representing at least a part of the known execution of the application, wherein based on a first label indicating that the execution trace is malicious, the respective image labels are assigned to the images to indicate that behaviors represented by the images are malicious.

18. A method, the method comprising:
converting a first data of a first control flow packet to a first pixel, wherein the first data indicates one or more branches taken during a known execution of an application;
generating an array of pixels using the first pixel and one or more other pixels associated with one or more other control flow packets generated from the known execution;
transforming the array of pixels into a series of images; and
using a machine learning algorithm with inputs to train a behavior model to identify a malicious behavior in an unknown execution of the application, wherein the inputs include one or more images of the series of images and respective image labels assigned to the one or more images.

19. The method of claim 18, further comprising:
extracting the first control flow packet from an execution trace representing at least a part of the known execution of the application, wherein based on a first label indicating that the execution trace is malicious, the respective image labels are assigned to the images to indicate that behaviors represented by the images are malicious.

20. The method of claim 19, further comprising:
identifying a location in the execution trace corresponding to an initiation of a malware attack;
identifying a pixel in an image of the series of images corresponding to the identified location in the execution trace; and
selecting the image containing the pixel and each subsequent image representing the execution trace as the one or more images to which the respective image labels are to be assigned.

* * * * *